United States Patent
Tabeta

(10) Patent No.: US 8,312,310 B2
(45) Date of Patent: Nov. 13, 2012

(54) APPARATUS AND METHOD FOR CHANGING CLOCK FREQUENCY AND MODULATION METHOD BASED ON CURRENT STATE

(75) Inventor: Hideya Tabeta, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 639 days.

(21) Appl. No.: 12/107,668

(22) Filed: Apr. 22, 2008

(65) Prior Publication Data

US 2008/0276113 A1 Nov. 6, 2008

(30) Foreign Application Priority Data

May 1, 2007 (JP) ................................. 2007-120905

(51) Int. Cl.
*G06F 1/00* (2006.01)
*H04B 1/00* (2006.01)

(52) U.S. Cl. ......... 713/500; 713/322; 713/501; 375/135

(58) Field of Classification Search .................. 713/322, 713/500, 501; 375/135
See application file for complete search history.

(56) References Cited

U.S. PATENT DOCUMENTS

| | | | | |
|---|---|---|---|---|
| 3,619,784 A | * | 11/1971 | Wycoff | 455/116 |
| 3,745,559 A | * | 7/1973 | Mattern | 341/111 |
| 3,833,861 A | * | 9/1974 | Wycoff | 331/48 |
| 4,912,573 A | * | 3/1990 | Murabayashi et al. | 360/51 |
| 5,146,352 A | * | 9/1992 | Nannichi | 358/451 |
| 5,341,396 A | * | 8/1994 | Higgins et al. | 375/130 |
| 5,499,201 A | * | 3/1996 | Wenger et al. | 713/321 |
| 5,708,961 A | * | 1/1998 | Hylton et al. | 725/81 |
| 6,020,981 A | * | 2/2000 | Ogiyama | 358/434 |
| 6,108,560 A | * | 8/2000 | Navaro et al. | 455/517 |
| 6,125,451 A | * | 9/2000 | Fukunaga | 713/500 |
| 6,360,328 B1 | * | 3/2002 | Muraki et al. | 713/501 |
| 6,393,078 B1 | * | 5/2002 | Sattler | 375/346 |
| 6,574,739 B1 | * | 6/2003 | Kung et al. | 713/322 |
| 6,667,704 B1 | * | 12/2003 | Grale et al. | 341/123 |
| 6,687,841 B1 | * | 2/2004 | Marukawa | 713/500 |
| 6,895,519 B2 | | 5/2005 | Endo | |
| 6,907,535 B2 | * | 6/2005 | Fang | 713/322 |
| 6,992,614 B1 | * | 1/2006 | Joyce | 342/122 |

(Continued)

FOREIGN PATENT DOCUMENTS

JP 54000558 A * 1/1979

(Continued)

OTHER PUBLICATIONS

Glisic, S.; Nikolic, Z.; Milosevic, N.; Pouttu, A.; , "Advanced frequency hopping modulation for spread spectrum WLAN," Selected Areas in Communications, IEEE Journal on , vol. 18, No. 1, pp. 16-29, Jan. 2000.*

(Continued)

*Primary Examiner* — Faisal M Zaman
(74) *Attorney, Agent, or Firm* — Canon U.S.A., Inc. IP Division

(57) ABSTRACT

An electronic apparatus with a wireless unit includes a multiplier to receive a clock signal at a predetermined frequency. The electronic apparatus further includes a modulator configured to modulate the frequency of the clock signal generated by the multiplier, and a controller configured to change the frequency of the clock signal generated by the multiplier and a modulation rate of the modulation performed by the modulator according to a state of the electronic apparatus.

15 Claims, 25 Drawing Sheets

U.S. PATENT DOCUMENTS

| | | | |
|---|---|---|---|
| 7,184,491 B2 * | 2/2007 | Suzuki et al. | 375/297 |
| 7,310,112 B1 * | 12/2007 | Watanabe | 348/207.1 |
| 7,366,936 B2 * | 4/2008 | Usami | 713/400 |
| 7,385,732 B2 * | 6/2008 | Sakai | 358/463 |
| 7,558,311 B2 * | 7/2009 | Shin et al. | 375/130 |
| 7,711,966 B2 * | 5/2010 | Prabhakaran et al. | 713/300 |
| 2002/0005874 A1 * | 1/2002 | Imai et al. | 347/33 |
| 2002/0120881 A1 * | 8/2002 | Kamei | 713/501 |
| 2003/0026622 A1 * | 2/2003 | Kawase | 399/27 |
| 2004/0047425 A1 * | 3/2004 | Itoh | 375/259 |
| 2004/0148515 A1 * | 7/2004 | Kikuchi | 713/200 |
| 2005/0159179 A1 * | 7/2005 | Sainton et al. | 455/552.1 |
| 2006/0055902 A1 * | 3/2006 | Ohkawara et al. | 355/47 |
| 2006/0077821 A1 * | 4/2006 | Usui et al. | 369/47.1 |
| 2007/0223511 A1 * | 9/2007 | Imaeda | 370/437 |
| 2008/0100350 A1 * | 5/2008 | Pernia et al. | 327/114 |
| 2008/0215907 A1 * | 9/2008 | Wilson | 713/500 |
| 2011/0078350 A1 * | 3/2011 | Carls | 710/110 |

FOREIGN PATENT DOCUMENTS

| | | | |
|---|---|---|---|
| JP | 03161826 A | * | 7/1991 |
| JP | 04245731 A | * | 9/1992 |
| JP | 08007287 A | * | 1/1996 |
| JP | 2001-160788 A | | 6/2001 |
| JP | 2003-248524 A | | 9/2003 |
| JP | 2003-256069 A | | 9/2003 |
| JP | 2011146763 A | * | 7/2011 |
| JP | 2012080478 A | * | 4/2012 |

OTHER PUBLICATIONS

Rofougaran, A.; Chang, G.; Rael, J.J.; Chang, J.Y.-C.; Rofougaran, M.; Chang, P.J.; Djafari, M.; Min, J.; Roth, E.W.; Abidi, A.A.; Samueli, H.; , "A single-chip 900-MHz spread-spectrum wireless transceiver in 1-µm CMOS. II. Receiver design," Solid-State Circuits, IEEE Journal of, vol. 33, No. 4, pp. 535-547, Apr. 1998.*

* cited by examiner

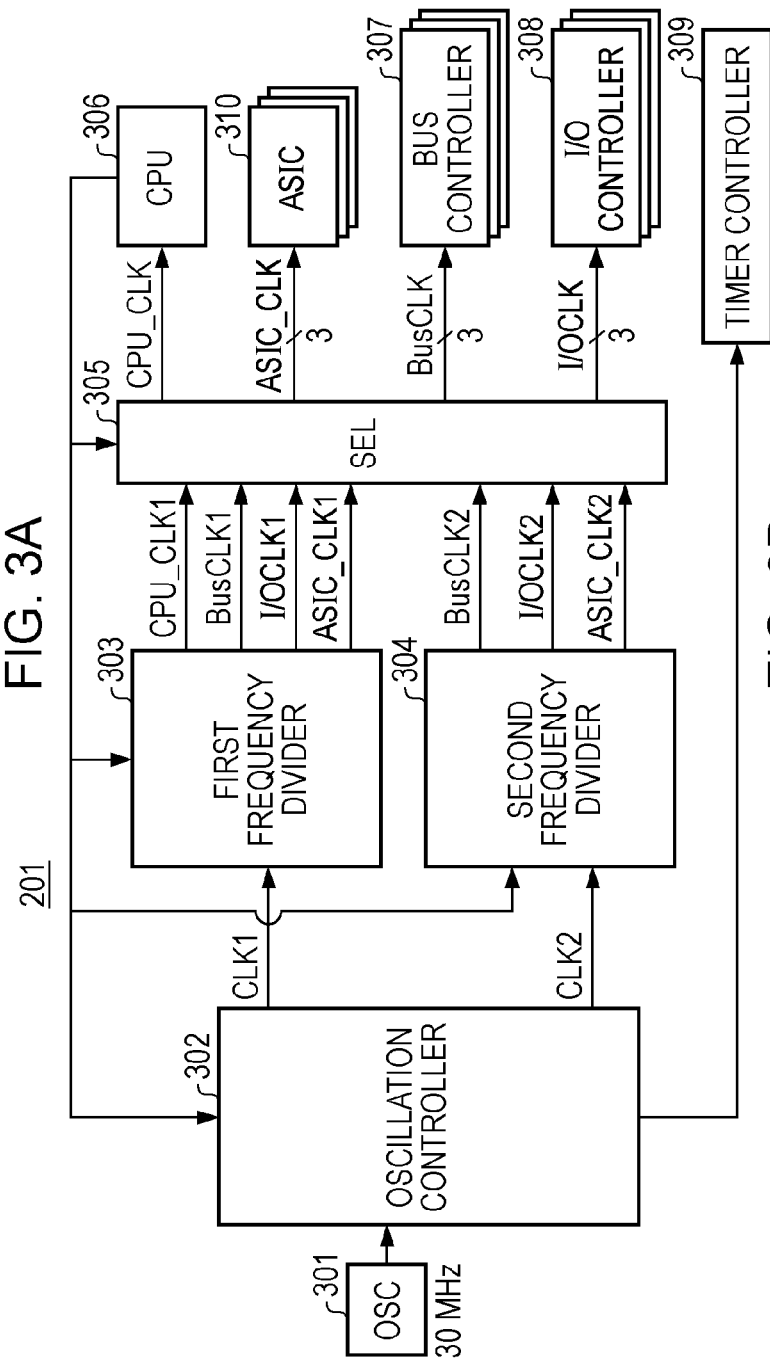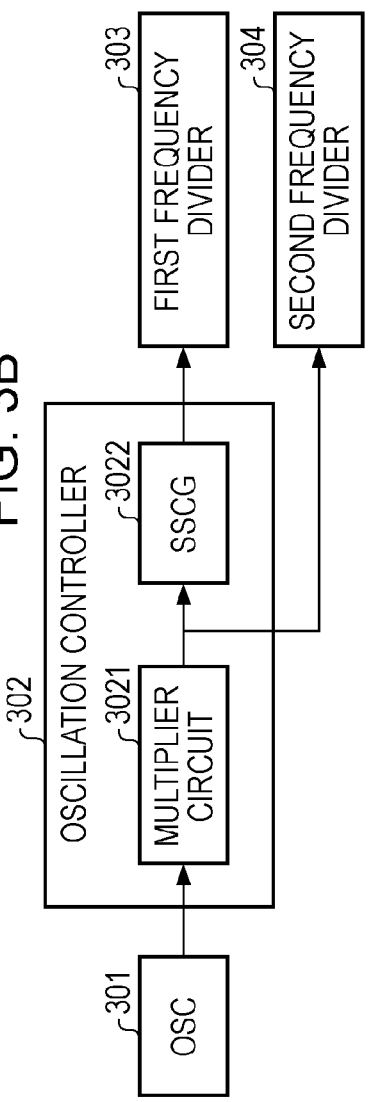

| 12 MHz | 24 MHz | 48 MHz | 96 MHz | 192 MHz | WEIGHT | 3 % | 2 % | 1 % | 0.50 % |
|---|---|---|---|---|---|---|---|---|---|
| 240 | 240 | 240 | | | 3 | 0.5 | 0.75 | 1.5 | 3 |
| 252 | | | | | 1 | 0.167 | 0.25 | 0.5 | 1 |
| 264 | 264 | | | | 2 | 0.333 | 0.5 | 1 | 2 |
| 276 | | | | | 1 | 0.167 | 0.25 | 0.5 | 1 |
| 288 | 288 | 288 | 288 | | 4 | 0.666 | 1 | 2 | 4 |
| 300 | | | | | 1 | 0.167 | 0.25 | 0.5 | 1 |
| 312 | 312 | | | | 2 | 0.333 | 0.5 | 1 | 2 |
| 324 | | | | | 1 | 0.167 | 0.25 | 0.5 | 1 |
| 336 | 336 | 336 | | | 3 | 0.5 | 0.75 | 1.5 | 3 |
| 348 | | | | | 1 | 0.167 | 0.25 | 0.5 | 1 |
| 360 | 360 | | | | 2 | 0.333 | 0.5 | 1 | 2 |
| 372 | | | | | 1 | 0.167 | 0.25 | 0.5 | 1 |
| 384 | 384 | 384 | 384 | 384 | 5 | 0.833 | 1.25 | 2.5 | 5 |
| 396 | | | | | 1 | 0.167 | 0.25 | 0.5 | 1 |
| 408 | 408 | | | | 2 | 0.333 | 0.5 | 1 | 2 |

FIG. 6

| REFERENCE FREQUENCY | 3 % | 2 % | 1 % | 0.50 % | 3 % | 2 % | 1 % | 0.50 % | 3 % | 2 % | 1 % | 0.50 % |
|---|---|---|---|---|---|---|---|---|---|---|---|---|
| 240 | 247.2 | 244.8 | 242.4 | 241.2 | 0 % | 0 % | 0 % | 0 % | 0.00 | 0.00 | 0.00 | 0.00 |
| 252 | 259.6 | 257.0 | 254.5 | 253.3 | 100 % | 100 % | 40 % | 0 % | 0.17 | 0.25 | 0.20 | 0.00 |
| 264 | 271.9 | 269.3 | 266.6 | 265.3 | 0 % | 0 % | 0 % | 0 % | 0.00 | 0.00 | 0.00 | 0.00 |
| 276 | 284.3 | 281.5 | 278.8 | 277.4 | 0 % | 0 % | 0 % | 0 % | 0.00 | 0.00 | 0.00 | 0.00 |
| 288 | 296.6 | 293.8 | 290.9 | 289.4 | 0 % | 0 % | 0 % | 0 % | 0.00 | 0.00 | 0.00 | 0.00 |
| 300 | 309.0 | 306.0 | 303.0 | 301.5 | 0 % | 0 % | 0 % | 0 % | 0.00 | 0.00 | 0.00 | 0.00 |
| 312 | 321.4 | 318.2 | 315.1 | 313.6 | 0 % | 0 % | 0 % | 0 % | 0.00 | 0.00 | 0.00 | 0.00 |
| 324 | 333.7 | 330.5 | 327.2 | 325.6 | 0 % | 0 % | 0 % | 0 % | 0.00 | 0.00 | 0.00 | 0.00 |
| 336 | 346.1 | 342.7 | 339.4 | 337.7 | 0 % | 0 % | 0 % | 0 % | 0.00 | 0.00 | 0.00 | 0.00 |
| 348 | 358.4 | 355.0 | 351.5 | 349.7 | 0 % | 0 % | 0 % | 0 % | 0.00 | 0.00 | 0.00 | 0.00 |
| 360 | 370.8 | 367.2 | 363.6 | 361.8 | 0 % | 0 % | 0 % | 0 % | 0.00 | 0.00 | 0.00 | 0.00 |
| 372 | 383.2 | 379.4 | 375.7 | 373.9 | 100 % | 0 % | 0 % | 0 % | 0.17 | 0.00 | 0.00 | 0.00 |
| 384 | 395.5 | 391.7 | 387.8 | 385.9 | 0 % | 0 % | 0 % | 0 % | 0.00 | 0.00 | 0.00 | 0.00 |
| 396 | 407.9 | 403.9 | 400.0 | 398.0 | 0 % | 0 % | 0 % | 0 % | 0.00 | 0.00 | 0.00 | 0.00 |
| 408 | 420.2 | 416.2 | 412.1 | 410.0 | 0 % | 0 % | 0 % | 0 % | 0.00 | 0.00 | 0.00 | 0.00 |
| TOTAL OF RX ONLY | | | | | | | | | 0.17 | 0.25 | 0.20 | 0.00 |
| TOTAL OF TX AND RX | | | | | | | | | 0.33 | 0.25 | 0.20 | 0.00 |

FIG. 7

| REFERENCE FREQUENCY | -3 % | -2 % | -1 % | -0.50 % | 3 % | 2 % | 1 % | 0.50 % | 3 % | 2 % | 1 % | 0.50 % |
|---|---|---|---|---|---|---|---|---|---|---|---|---|
| 240 | 232.8 | 235.2 | 237.6 | 238.8 | 0 % | 0 % | 0 % | 0 % | 0.00 | 0.00 | 0.00 | 0.00 |
| 252 | 244.4 | 247.0 | 249.5 | 250.7 | 0 % | 0 % | 0 % | 0 % | 0.00 | 0.00 | 0.00 | 0.00 |
| 264 | 256.1 | 258.7 | 261.4 | 262.7 | 0 % | 0 % | 0 % | 0 % | 0.00 | 0.00 | 0.00 | 0.00 |
| 276 | 267.7 | 270.5 | 273.2 | 274.6 | 0 % | 0 % | 0 % | 0 % | 0.00 | 0.00 | 0.00 | 0.00 |
| 288 | 279.4 | 282.2 | 285.1 | 286.6 | 0 % | 0 % | 0 % | 0 % | 0.00 | 0.00 | 0.00 | 0.00 |
| 300 | 291.0 | 294.0 | 297.0 | 298.5 | 0 % | 0 % | 0 % | 0 % | 0.00 | 0.00 | 0.00 | 0.00 |
| 312 | 302.6 | 305.8 | 308.9 | 310.4 | 0 % | 0 % | 0 % | 0 % | 0.00 | 0.00 | 0.00 | 0.00 |
| 324 | 314.3 | 317.5 | 320.8 | 322.4 | 0 % | 0 % | 0 % | 0 % | 0.00 | 0.00 | 0.00 | 0.00 |
| 336 | 325.9 | 329.3 | 332.6 | 334.3 | 0 % | 0 % | 0 % | 0 % | 0.00 | 0.00 | 0.00 | 0.00 |
| 348 | 337.6 | 341.0 | 344.5 | 346.3 | 0 % | 0 % | 0 % | 0 % | 0.00 | 0.00 | 0.00 | 0.00 |
| 360 | 349.2 | 352.8 | 356.4 | 358.2 | 0 % | 0 % | 0 % | 0 % | 0.00 | 0.00 | 0.00 | 0.00 |
| 372 | 360.8 | 364.6 | 368.3 | 370.1 | 0 % | 0 % | 0 % | 0 % | 0.00 | 0.00 | 0.00 | 0.00 |
| 384 | 372.5 | 376.3 | 380.2 | 382.1 | 100 % | 100 % | 100 % | 0 % | 0.83 | 1.25 | 2.50 | 0.00 |
| 396 | 384.1 | 388.1 | 392.0 | 394.0 | 0 % | 0 % | 0 % | 0 % | 0.00 | 0.00 | 0.00 | 0.00 |
| 408 | 395.8 | 399.8 | 403.9 | 406.0 | 0 % | 0 % | 0 % | 0 % | 0.00 | 0.00 | 0.00 | 0.00 |
| TOTAL OF RX ONLY | | | | | | | | | 0.00 | 0.00 | 0.00 | 0.00 |
| TOTAL OF TX AND RX | | | | | | | | | 0.83 | 1.25 | 2.50 | 0.00 |

FIG. 8

| REFERENCE FREQUENCY | -1.5 % | -1.0 % | -0.5 % | -0.3 % | 0.3 % | 0.5 % | 1.0 % | 1.5 % | 3.0 % | 2.0 % | 1.0 % | 0.5 % | 3.0 % | 2.0 % | 1.0 % | 0.5 % |
|---|---|---|---|---|---|---|---|---|---|---|---|---|---|---|---|---|
| 240 | 236.4 | 237.6 | 238.8 | 239.4 | 240.6 | 241.2 | 242.4 | 243.6 | 0.0 % | 0.0 % | 0.0 % | 0.0 % | 0.00 | 0.00 | 0.00 | 0.00 |
| 252 | 248.2 | 249.5 | 250.7 | 251.4 | 252.6 | 253.3 | 254.5 | 255.8 | 0.0 % | 60.0 % | 0.0 % | 0.0 % | 0.17 | 0.15 | 0.00 | 0.00 |
| 264 | 260.0 | 261.4 | 262.7 | 263.3 | 264.7 | 265.3 | 266.6 | 268.0 | 0.0 % | 0.0 % | 0.0 % | 0.0 % | 0.00 | 0.00 | 0.00 | 0.00 |
| 276 | 271.9 | 273.2 | 274.6 | 275.3 | 276.7 | 277.4 | 278.8 | 280.1 | 0.0 % | 0.0 % | 0.0 % | 0.0 % | 0.00 | 0.00 | 0.00 | 0.00 |
| 288 | 283.7 | 285.1 | 286.6 | 287.3 | 288.7 | 289.4 | 290.9 | 292.3 | 0.0 % | 0.0 % | 0.0 % | 0.0 % | 0.00 | 0.00 | 0.00 | 0.00 |
| 300 | 295.5 | 297.0 | 298.5 | 299.3 | 300.8 | 301.5 | 303.0 | 304.5 | 0.0 % | 0.0 % | 0.0 % | 0.0 % | 0.00 | 0.00 | 0.00 | 0.00 |
| 312 | 307.3 | 308.9 | 310.4 | 311.2 | 312.8 | 313.6 | 315.1 | 316.7 | 0.0 % | 0.0 % | 0.0 % | 0.0 % | 0.00 | 0.00 | 0.00 | 0.00 |
| 324 | 319.1 | 320.8 | 322.4 | 323.2 | 324.8 | 325.6 | 327.2 | 328.9 | 0.0 % | 0.0 % | 0.0 % | 0.0 % | 0.00 | 0.00 | 0.00 | 0.00 |
| 336 | 331.0 | 332.6 | 334.3 | 335.2 | 336.8 | 337.7 | 339.4 | 341.0 | 0.0 % | 0.0 % | 0.0 % | 0.0 % | 0.00 | 0.00 | 0.00 | 0.00 |
| 348 | 342.8 | 344.5 | 346.3 | 347.1 | 348.9 | 349.7 | 351.5 | 353.2 | 0.0 % | 0.0 % | 0.0 % | 0.0 % | 0.00 | 0.00 | 0.00 | 0.00 |
| 360 | 354.6 | 356.4 | 358.2 | 359.1 | 360.9 | 361.8 | 363.6 | 365.4 | 0.0 % | 0.0 % | 0.0 % | 0.0 % | 0.00 | 0.00 | 0.00 | 0.00 |
| 372 | 366.4 | 368.3 | 370.1 | 371.1 | 372.9 | 373.9 | 375.7 | 377.6 | 0.0 % | 0.0 % | 0.0 % | 0.0 % | 0.00 | 0.00 | 0.00 | 0.00 |
| 384 | 378.2 | 380.2 | 382.1 | 383.0 | 385.0 | 385.9 | 387.8 | 389.8 | 100.0 % | 0.0 % | 0.0 % | 0.0 % | 0.83 | 1.25 | 0.00 | 0.00 |
| 396 | 390.1 | 392.0 | 394.0 | 395.0 | 397.0 | 398.0 | 400.0 | 401.9 | 0.0 % | 100.0 % | 0.0 % | 0.0 % | 0.00 | 0.00 | 0.00 | 0.00 |
| 408 | 401.9 | 403.9 | 406.0 | 407.0 | 409.0 | 410.0 | 412.1 | 414.1 | 0.0 % | 0.0 % | 0.0 % | 0.0 % | 0.00 | 0.00 | 0.00 | 0.00 |
| TOTAL OF RX ONLY | | | | | | | | | | | | | 0.17 | 0.15 | 0.00 | 0.00 |
| TOTAL OF TX AND RX | | | | | | | | | | | | | 1.00 | 1.40 | 0.00 | 0.00 |

FIG. 9

| 12 MHz | 24 MHz | 48 MHz | 96 MHz | 192 MHz | WEIGHT | 3 % | 2 % | 1 % | 0.50 % |
|---|---|---|---|---|---|---|---|---|---|
| 2328 | 2328 | | | | 2 | 0.33 | 0.50 | 1.00 | 2.00 |
| 2340 | | | | | 1 | 0.17 | 0.25 | 0.50 | 1.00 |
| 2352 | 2352 | 2352 | | | 3 | 0.50 | 0.75 | 1.50 | 3.00 |
| 2364 | | | | | 1 | 0.17 | 0.25 | 0.50 | 1.00 |
| 2376 | 2376 | | | | 2 | 0.33 | 0.50 | 1.00 | 2.00 |
| 2388 | | | | | 1 | 0.17 | 0.25 | 0.50 | 1.00 |
| 2400 | 2400 | 2400 | 2400 | | 6 | 1.00 | 1.50 | 3.00 | 6.00 |
| 2412 | | | | | 3 | 0.50 | 0.75 | 1.50 | 3.00 |
| 2424 | 2424 | | | | 4 | 0.67 | 1.00 | 2.00 | 4.00 |
| 2436 | | | | | 3 | 0.50 | 0.75 | 1.50 | 3.00 |
| 2448 | 2448 | 2448 | | | 5 | 0.83 | 1.25 | 2.50 | 5.00 |
| 2460 | | | | | 3 | 0.50 | 0.75 | 1.50 | 3.00 |
| 2472 | 2472 | | | | 4 | 0.67 | 1.00 | 2.00 | 4.00 |
| 2484 | | | | | 3 | 0.50 | 0.75 | 1.50 | 3.00 |
| 2496 | 2496 | 2496 | 2496 | 2496 | 5 | 0.83 | 1.25 | 2.50 | 5.00 |
| 2508 | | | | | 1 | 0.17 | 0.25 | 0.50 | 1.00 |
| 2520 | 2520 | | | | 2 | 0.33 | 0.50 | 1.00 | 2.00 |
| 2532 | | | | | 1 | 0.17 | 0.25 | 0.50 | 1.00 |
| 2544 | 2544 | 2544 | | | 3 | 0.50 | 0.75 | 1.50 | 3.00 |
| 2556 | | | | | 1 | 0.17 | 0.25 | 0.50 | 1.00 |
| 2568 | 2568 | | | | 2 | 0.33 | 0.50 | 1.00 | 2.00 |

FIG. 10

| REFERENCE FREQUENCY | -3 % | -2 % | -1 % | -0.50 % | 3 % | 2 % | 1 % | 0.50 % | 3 % | 0.02 | 1 % | 0.50 % |
|---|---|---|---|---|---|---|---|---|---|---|---|---|
| 2328 | 2258.2 | 2281.4 | 2304.7 | 2316.4 | 0 % | 0 % | 0 % | 0 % | 0.00 | 0.00 | 0.00 | 0.00 |
| 2340 | 2269.8 | 2293.2 | 2316.6 | 2328.3 | 0 % | 0 % | 0 % | 0 % | 0.00 | 0.00 | 0.00 | 0.00 |
| 2352 | 2281.4 | 2305.0 | 2328.5 | 2340.2 | 0 % | 0 % | 0 % | 0 % | 0.00 | 0.00 | 0.00 | 0.00 |
| 2364 | 2293.1 | 2316.7 | 2340.4 | 2352.2 | 0 % | 0 % | 0 % | 0 % | 0.00 | 0.00 | 0.00 | 0.00 |
| 2376 | 2304.7 | 2328.5 | 2352.2 | 2364.1 | 0 % | 0 % | 0 % | 0 % | 0.00 | 0.00 | 0.00 | 0.00 |
| 2388 | 2316.4 | 2340.2 | 2364.1 | 2376.1 | 0 % | 0 % | 0 % | 0 % | 0.00 | 0.00 | 0.00 | 0.00 |
| 2400 | 2328.0 | 2352.0 | 2376.0 | 2388.0 | 0 % | 0 % | 0 % | 0 % | 0.00 | 0.00 | 0.00 | 0.00 |
| 2412 | 2339.6 | 2363.8 | 2387.9 | 2399.9 | 14 % | 14 % | 14 % | 14 % | 0.07 | 0.11 | 0.22 | 0.43 |
| 2424 | 2351.3 | 2375.5 | 2399.8 | 2411.9 | 29 % | 29 % | 29 % | 15 % | 0.19 | 0.29 | 0.58 | 0.58 |
| 2436 | 2362.9 | 2387.3 | 2411.6 | 2423.8 | 43 % | 43 % | 29 % | 15 % | 0.22 | 0.32 | 0.44 | 0.44 |
| 2448 | 2374.6 | 2399.0 | 2423.5 | 2435.8 | 57 % | 57 % | 29 % | 15 % | 0.48 | 0.72 | 0.73 | 0.73 |
| 2460 | 2386.2 | 2410.8 | 2435.4 | 2447.7 | 72 % | 59 % | 29 % | 15 % | 0.36 | 0.44 | 0.44 | 0.44 |
| 2472 | 2397.8 | 2422.6 | 2447.3 | 2459.6 | 86 % | 59 % | 30 % | 15 % | 0.57 | 0.59 | 0.59 | 0.59 |
| 2484 | 2409.5 | 2434.3 | 2459.2 | 2471.6 | 89 % | 59 % | 29 % | 14 % | 0.44 | 0.44 | 0.44 | 0.43 |
| 2496 | 2421.1 | 2446.1 | 2471.0 | 2483.5 | 75 % | 45 % | 15 % | 1 % | 0.62 | 0.56 | 0.37 | 0.05 |
| 2508 | 2432.8 | 2457.8 | 2482.9 | 2495.5 | 61 % | 31 % | 1 % | 0 % | 0.10 | 0.08 | 0.00 | 0.00 |
| 2520 | 2444.4 | 2469.6 | 2494.8 | 2507.4 | 47 % | 17 % | 0 % | 0 % | 0.16 | 0.08 | 0.00 | 0.00 |
| 2532 | 2456.0 | 2481.4 | 2506.7 | 2519.3 | 33 % | 3 % | 0 % | 0 % | 0.05 | 0.01 | 0.00 | 0.00 |
| 2544 | 2467.7 | 2493.1 | 2518.6 | 2531.3 | 19 % | 0 % | 0 % | 0 % | 0.09 | 0.00 | 0.00 | 0.00 |
| 2556 | 2479.3 | 2504.9 | 2530.4 | 2543.2 | 5 % | 0 % | 0 % | 0 % | 0.01 | 0.00 | 0.00 | 0.00 |
| TOTAL OF TX AND RX | | | | | | | | | 3.37 | 3.64 | 3.81 | 3.69 |

FIG. 11

| REFERENCE FREQUENCY | 3 % | 2 % | 1 % | 0.50 % | 3 % | 2 % | 1 % | 0.50 % | 3 % | 0.02 | 1 % | 0.50 % |
|---|---|---|---|---|---|---|---|---|---|---|---|---|
| 2328 | 2397.8 | 2374.6 | 2351.3 | 2339.6 | 0 % | 0 % | 0 % | 0 % | 0.00 | 0.00 | 0.00 | 0.00 |
| 2340 | 2410.2 | 2386.8 | 2363.4 | 2351.7 | 12 % | 0 % | 0 % | 0 % | 0.02 | 0.00 | 0.00 | 0.00 |
| 2352 | 2422.6 | 2399.0 | 2375.5 | 2363.8 | 27 % | 0 % | 0 % | 0 % | 0.14 | 0.00 | 0.00 | 0.00 |
| 2364 | 2434.9 | 2411.3 | 2387.6 | 2375.8 | 42 % | 14 % | 0 % | 0 % | 0.07 | 0.03 | 0.00 | 0.00 |
| 2376 | 2447.3 | 2423.5 | 2399.8 | 2387.9 | 57 % | 28 % | 0 % | 0 % | 0.19 | 0.14 | 0.07 | 0.00 |
| 2388 | 2459.6 | 2435.8 | 2411.9 | 2399.9 | 71 % | 43 % | 14 % | 0 % | 0.12 | 0.11 | 0.86 | 0.00 |
| 2400 | 2472.0 | 2448.0 | 2424.0 | 2412.0 | 86 % | 57 % | 29 % | 14 % | 0.86 | 0.86 | 0.86 | 0.86 |
| 2412 | 2484.4 | 2460.2 | 2436.1 | 2424.1 | 87 % | 58 % | 29 % | 14 % | 0.43 | 0.43 | 0.43 | 0.43 |
| 2424 | 2496.7 | 2472.5 | 2448.2 | 2436.1 | 71 % | 58 % | 29 % | 15 % | 0.48 | 0.58 | 0.58 | 0.58 |
| 2436 | 2509.1 | 2484.7 | 2460.4 | 2448.2 | 57 % | 57 % | 29 % | 15 % | 0.28 | 0.43 | 0.44 | 0.44 |
| 2448 | 2521.4 | 2497.0 | 2472.5 | 2460.2 | 43 % | 43 % | 29 % | 15 % | 0.35 | 0.53 | 0.73 | 0.73 |
| 2460 | 2533.8 | 2509.2 | 2484.6 | 2472.3 | 28 % | 28 % | 28 % | 14 % | 0.14 | 0.21 | 0.42 | 0.44 |
| 2472 | 2546.2 | 2521.4 | 2496.7 | 2484.4 | 14 % | 14 % | 14 % | 0 % | 0.09 | 0.14 | 0.28 | 0.55 |
| 2484 | 2558.5 | 2533.7 | 2508.8 | 2496.4 | 0 % | 0 % | 0 % | 0 % | 0.00 | 0.00 | 0.00 | 0.00 |
| 2496 | 2570.9 | 2545.9 | 2521.0 | 2508.5 | 0 % | 0 % | 0 % | 0 % | 0.00 | 0.00 | 0.00 | 0.00 |
| 2508 | 2583.2 | 2558.2 | 2533.1 | 2520.5 | 0 % | 0 % | 0 % | 0 % | 0.00 | 0.00 | 0.00 | 0.00 |
| 2520 | 2595.6 | 2570.4 | 2545.2 | 2532.6 | 0 % | 0 % | 0 % | 0 % | 0.00 | 0.00 | 0.00 | 0.00 |
| 2532 | 2608.0 | 2582.6 | 2557.3 | 2544.7 | 0 % | 0 % | 0 % | 0 % | 0.00 | 0.00 | 0.00 | 0.00 |
| 2544 | 2620.3 | 2594.9 | 2569.4 | 2556.7 | 0 % | 0 % | 0 % | 0 % | 0.00 | 0.00 | 0.00 | 0.00 |
| 2556 | 2632.7 | 2607.1 | 2581.6 | 2568.8 | 0 % | 0 % | 0 % | 0 % | 0.00 | 0.00 | 0.00 | 0.00 |
| TOTAL OF TX AND RX | | | | | | | | | 3.17 | 3.46 | 3.82 | 4.04 |

FIG. 12

| REFERENCE FREQUENCY | -1.50 % | -1.00 % | -0.50 % | -0.25 % | 0.25 % | 0.50 % | 1 % | 1.50 % | ±1.5 % | ±1.0 % | ±0.5 % | ±0.25 % | ±1.5 % | ±1.0 % | ±0.5 % | ±0.25 % |
|---|---|---|---|---|---|---|---|---|---|---|---|---|---|---|---|---|
| 2328 | 2293.1 | 2304.7 | 2316.4 | 2322.2 | 2333.8 | 2339.6 | 2351.3 | 2362.9 | 0 % | 0 % | 0 % | 0 % | 0.00 | 0.00 | 0.00 | 0.00 |
| 2340 | 2304.9 | 2316.6 | 2328.3 | 2334.2 | 2345.9 | 2351.7 | 2363.4 | 2375.1 | 0 % | 0 % | 0 % | 0 % | 0.00 | 0.00 | 0.00 | 0.00 |
| 2352 | 2316.7 | 2328.5 | 2340.2 | 2346.1 | 2357.9 | 2363.8 | 2375.5 | 2387.3 | 0 % | 0 % | 0 % | 0 % | 0.00 | 0.00 | 0.00 | 0.00 |
| 2364 | 2328.5 | 2340.4 | 2352.2 | 2358.1 | 2369.9 | 2375.8 | 2387.6 | 2399.5 | 0 % | 0 % | 0 % | 0 % | 0.00 | 0.00 | 0.00 | 0.00 |
| 2376 | 2340.4 | 2352.2 | 2364.1 | 2370.1 | 2381.9 | 2387.9 | 2399.8 | 2411.6 | 14 % | 0 % | 0 % | 0 % | 0.05 | 0.00 | 0.00 | 0.00 |
| 2388 | 2352.2 | 2364.1 | 2376.1 | 2382.0 | 2394.0 | 2399.9 | 2411.9 | 2423.8 | 29 % | 14 % | 0 % | 0 % | 0.05 | 0.04 | 0.00 | 0.00 |
| 2400 | 2364.0 | 2376.0 | 2388.0 | 2394.0 | 2406.0 | 2412.0 | 2424.0 | 2436.0 | 43 % | 29 % | 14 % | 0 % | 0.43 | 0.43 | 0.43 | 0.43 |
| 2412 | 2375.8 | 2387.9 | 2399.9 | 2406.0 | 2418.0 | 2424.1 | 2436.1 | 2448.2 | 58 % | 43 % | 29 % | 14 % | 0.29 | 0.32 | 0.43 | 0.43 |
| 2424 | 2387.6 | 2399.8 | 2411.9 | 2417.9 | 2430.1 | 2436.1 | 2448.2 | 2460.4 | 72 % | 58 % | 29 % | 15 % | 0.48 | 0.58 | 0.58 | 0.58 |
| 2436 | 2399.5 | 2411.6 | 2423.8 | 2429.9 | 2442.1 | 2448.2 | 2460.4 | 2472.5 | 87 % | 58 % | 29 % | 15 % | 0.43 | 0.44 | 0.44 | 0.44 |
| 2448 | 2411.3 | 2423.5 | 2435.8 | 2441.9 | 2454.1 | 2460.2 | 2472.5 | 2484.7 | 86 % | 59 % | 29 % | 15 % | 0.72 | 0.73 | 0.73 | 0.73 |
| 2460 | 2423.1 | 2435.4 | 2447.7 | 2453.9 | 2466.2 | 2472.3 | 2484.6 | 2496.9 | 72 % | 58 % | 29 % | 15 % | 0.36 | 0.43 | 0.44 | 0.44 |
| 2472 | 2434.9 | 2447.3 | 2459.6 | 2465.8 | 2478.2 | 2484.4 | 2496.7 | 2509.1 | 58 % | 43 % | 29 % | 15 % | 0.39 | 0.43 | 0.57 | 0.59 |
| 2484 | 2446.7 | 2459.2 | 2471.6 | 2477.8 | 2490.2 | 2496.4 | 2508.8 | 2521.3 | 44 % | 29 % | 14 % | 7 % | 0.22 | 0.22 | 0.21 | 0.21 |
| 2496 | 2458.6 | 2471.0 | 2483.5 | 2489.8 | 2502.2 | 2508.5 | 2521.0 | 2533.4 | 30 % | 15 % | 0 % | 0 % | 0.25 | 0.19 | 0.00 | 0.00 |
| 2508 | 2470.4 | 2482.9 | 2495.5 | 2501.7 | 2514.3 | 2520.5 | 2533.1 | 2545.6 | 16 % | 1 % | 0 % | 0 % | 0.03 | 0.00 | 0.00 | 0.00 |
| 2520 | 2482.2 | 2494.8 | 2507.4 | 2513.7 | 2526.3 | 2532.6 | 2545.2 | 2557.8 | 2 % | 0 % | 0 % | 0 % | 0.01 | 0.00 | 0.00 | 0.00 |
| 2532 | 2494.0 | 2506.7 | 2519.3 | 2525.7 | 2538.3 | 2544.7 | 2557.3 | 2570.0 | 0 % | 0 % | 0 % | 0 % | 0.00 | 0.00 | 0.00 | 0.00 |
| 2544 | 2505.8 | 2518.6 | 2531.3 | 2537.6 | 2550.4 | 2556.7 | 2569.4 | 2582.2 | 0 % | 0 % | 0 % | 0 % | 0.00 | 0.00 | 0.00 | 0.00 |
| 2556 | 2517.7 | 2530.4 | 2543.2 | 2549.6 | 2562.4 | 2568.8 | 2581.6 | 2594.3 | 0 % | 0 % | 0 % | 0 % | 0.00 | 0.00 | 0.00 | 0.00 |
| TOTAL OF TX AND RX | | | | | | | | | | | | | 3.70 | 3.81 | 3.84 | 3.85 |

FIG. 13A

| SPREADING MODE | DOWN | | | | CENTER | | | | UP | | | |
|---|---|---|---|---|---|---|---|---|---|---|---|---|
| SPREADING RATE | 3 % | 2 % | 1 % | 0.50 % | 3 % | 2 % | 1 % | 0.50 % | 3 % | 2 % | 1 % | 0.50 % |
| LAN (RX) | 0.34 | 0.36 | 0.38 | 0.37 | 0.37 | 0.38 | 0.38 | 0.39 | 0.32 | 0.35 | 0.38 | 0.40 |
| PHONE (RX) | 0.00 | 0 | 0 | 0 | 0.167 | 0.15 | 0 | 0 | 0.167 | 0.25 | 0.2 | 0 |
| TOTAL | 0.34 | 0.36 | 0.38 | 0.37 | 0.54 | 0.53 | 0.38 | 0.39 | 0.48 | 0.60 | 0.58 | 0.40 |

FIG. 13B

| SPREADING MODE | DOWN | | | | CENTER | | | | UP | | | |
|---|---|---|---|---|---|---|---|---|---|---|---|---|
| SPREADING RATE | 3 % | 2 % | 1 % | 0.50 % | 3 % | 2 % | 1 % | 0.50 % | 3 % | 2 % | 1 % | 0.50 % |
| LAN (TX AND RX) | 0.34 | 0.36 | 0.38 | 0.37 | 0.37 | 0.38 | 0.38 | 0.39 | 0.32 | 0.35 | 0.38 | 0.40 |
| PHONE (TX AND RX) | 0.83 | 1.25 | 2.5 | 0 | 1 | 1.4 | 0 | 0 | 0.33 | 0.25 | 0.2 | 0 |
| LAN (TX/RX) + PHONE (TX/RX) | 1.17 | 1.61 | 2.88 | 0.37 | 1.37 | 1.78 | 0.38 | 0.39 | 0.65 | 0.60 | 0.58 | 0.40 |

FIG. 13C

| | SETTING | |
|---|---|---|
| LAN (RX) + PHONE (RX) | DOWN | 3.00 % |
| PHONE (TX AND RX) | CENTER | 0.50 % |
| LAN (TX AND RX) | UP | 3.00 % |
| PHONE (TX/RX) + LAN (TX/RX) | DOWN | 0.50 % |

FIG. 14

| 15 MHz | 30 MHz | 60 MHz | 120 MHz | 240 MHz | WEIGHT | 3 % | 2 % | 1 % | 0.5 % |
|---|---|---|---|---|---|---|---|---|---|
| 210 | 210 | | | | 2 | 0.33 | 0.50 | 1.00 | 2.00 |
| 225 | | | | | 1 | 0.17 | 0.25 | 0.50 | 1.00 |
| 240 | 240 | 240 | 240 | 240 | 5 | 0.83 | 1.25 | 2.50 | 5.00 |
| 255 | | | | | 1 | 0.17 | 0.25 | 0.50 | 1.00 |
| 270 | 270 | | | | 2 | 0.33 | 0.50 | 1.00 | 2.00 |
| 285 | | | | | 1 | 0.17 | 0.25 | 0.50 | 1.00 |
| 300 | 300 | 300 | | | 3 | 0.50 | 0.75 | 1.50 | 3.00 |
| 315 | | | | | 1 | 0.17 | 0.25 | 0.50 | 1.00 |
| 330 | 330 | | | | 2 | 0.33 | 0.50 | 1.00 | 2.00 |
| 345 | | | | | 1 | 0.17 | 0.25 | 0.50 | 1.00 |
| 360 | 360 | 360 | 360 | | 4 | 0.67 | 1.00 | 2.00 | 4.00 |
| 375 | | | | | 1 | 0.17 | 0.25 | 0.50 | 1.00 |
| 390 | 390 | | | | 2 | 0.33 | 0.50 | 1.00 | 2.00 |
| 405 | | | | | 1 | 0.17 | 0.25 | 0.50 | 1.00 |
| 420 | 420 | 420 | | | 3 | 0.50 | 0.75 | 1.50 | 3.00 |

FIG. 15

| REFERENCE FREQUENCY | -3 % | -2 % | -1 % | -0.50 % | 3 % | 2 % | 1 % | 0.50 % | 3 % | 2 % | 1 % | 0.50 % |
|---|---|---|---|---|---|---|---|---|---|---|---|---|
| 210 | 203.7 | 205.8 | 207.9 | 209.0 | 0 % | 0 % | 0 % | 0 % | 0.00 | 0.00 | 0.00 | 0.00 |
| 225 | 218.3 | 220.5 | 222.8 | 223.9 | 0 % | 0 % | 0 % | 0 % | 0.00 | 0.00 | 0.00 | 0.00 |
| 240 | 232.8 | 235.2 | 237.6 | 238.8 | 0 % | 0 % | 0 % | 0 % | 0.00 | 0.00 | 0.00 | 0.00 |
| 255 | 247.4 | 249.9 | 252.5 | 253.7 | 100 % | 100 % | 100 % | 100 % | 0.17 | 0.25 | 0.50 | 1.00 |
| 270 | 261.9 | 264.6 | 267.3 | 268.7 | 0 % | 0 % | 0 % | 0 % | 0.00 | 0.00 | 0.00 | 0.00 |
| 285 | 276.5 | 279.3 | 282.2 | 283.6 | 0 % | 0 % | 0 % | 0 % | 0.00 | 0.00 | 0.00 | 0.00 |
| 300 | 291.0 | 294.0 | 297.0 | 298.5 | 0 % | 0 % | 0 % | 0 % | 0.00 | 0.00 | 0.00 | 0.00 |
| 315 | 305.6 | 308.7 | 311.9 | 313.4 | 0 % | 0 % | 0 % | 0 % | 0.00 | 0.00 | 0.00 | 0.00 |
| 330 | 320.1 | 323.4 | 326.7 | 328.4 | 0 % | 0 % | 0 % | 0 % | 0.00 | 0.00 | 0.00 | 0.00 |
| 345 | 334.7 | 338.1 | 341.6 | 343.3 | 0 % | 0 % | 0 % | 0 % | 0.00 | 0.00 | 0.00 | 0.00 |
| 360 | 349.2 | 352.8 | 356.4 | 358.2 | 0 % | 0 % | 0 % | 0 % | 0.00 | 0.00 | 0.00 | 0.00 |
| 375 | 363.8 | 367.5 | 371.3 | 373.1 | 0 % | 0 % | 0 % | 0 % | 0.00 | 0.00 | 0.00 | 0.00 |
| 390 | 378.3 | 382.2 | 386.1 | 388.1 | 100 % | 0 % | 0 % | 0 % | 0.33 | 0.00 | 2.50 | 0.00 |
| 405 | 392.9 | 396.9 | 401.0 | 403.0 | 0 % | 0 % | 0 % | 0 % | 0.00 | 0.00 | 0.00 | 0.00 |
| 420 | 407.4 | 411.6 | 415.8 | 417.9 | 0 % | 0 % | 0 % | 0 % | 0.00 | 0.00 | 0.00 | 0.00 |
| TOTAL OF RX ONLY | | | | | | | | | 0.17 | 0.25 | 0.50 | 1.00 |
| TOTAL OF TX AND RX | | | | | | | | | 0.50 | 0.25 | 0.50 | 1.00 |

FIG. 16

| REFERENCE FREQUENCY | 3 % | 2 % | 1 % | 0.50 % | 3 % | 2 % | 1 % | 0.50 % | 3 % | 2 % | 1 % | 0.50 % |
|---|---|---|---|---|---|---|---|---|---|---|---|---|
| 210 | 216.3 | 214.2 | 212.1 | 211.1 | 0 % | 0 % | 0 % | 0 % | 0.00 | 0.00 | 0.00 | 0.00 |
| 225 | 231.8 | 229.5 | 227.3 | 226.1 | 0 % | 0 % | 0 % | 0 % | 0.00 | 0.00 | 0.00 | 0.00 |
| 240 | 247.2 | 244.8 | 242.4 | 241.2 | 0 % | 0 % | 0 % | 0 % | 0.00 | 0.00 | 0.00 | 0.00 |
| 255 | 262.7 | 260.1 | 257.6 | 256.3 | 0 % | 0 % | 0 % | 0 % | 0.00 | 0.00 | 0.00 | 0.00 |
| 270 | 278.1 | 275.4 | 272.7 | 271.4 | 0 % | 0 % | 0 % | 0 % | 0.00 | 0.00 | 0.00 | 0.00 |
| 285 | 293.6 | 290.7 | 287.9 | 286.4 | 0 % | 0 % | 0 % | 0 % | 0.00 | 0.00 | 0.00 | 0.00 |
| 300 | 309.0 | 306.0 | 303.0 | 301.5 | 0 % | 0 % | 0 % | 0 % | 0.00 | 0.00 | 0.00 | 0.00 |
| 315 | 324.5 | 321.3 | 318.2 | 316.6 | 0 % | 0 % | 0 % | 0 % | 0.00 | 0.00 | 0.00 | 0.00 |
| 330 | 339.9 | 336.6 | 333.3 | 331.7 | 0 % | 0 % | 0 % | 0 % | 0.00 | 0.00 | 0.00 | 0.00 |
| 345 | 355.4 | 351.9 | 348.5 | 346.7 | 0 % | 0 % | 0 % | 0 % | 0.00 | 0.00 | 0.00 | 0.00 |
| 360 | 370.8 | 367.2 | 363.6 | 361.8 | 0 % | 0 % | 0 % | 0 % | 0.00 | 0.00 | 0.00 | 0.00 |
| 375 | 386.3 | 382.5 | 378.8 | 376.9 | 100 % | 0 % | 0 % | 0 % | 0.17 | 0.25 | 0.00 | 0.00 |
| 390 | 401.7 | 397.8 | 393.9 | 392.0 | 0 % | 100 % | 0 % | 0 % | 0.00 | 0.00 | 0.00 | 0.00 |
| 405 | 417.2 | 413.1 | 409.1 | 407.0 | 0 % | 0 % | 0 % | 0 % | 0.00 | 0.00 | 0.00 | 0.00 |
| 420 | 432.6 | 428.4 | 424.2 | 422.1 | 0 % | 0 % | 0 % | 0 % | 0.00 | 0.00 | 0.00 | 0.00 |
| TOTAL OF RX ONLY | | | | | | | | | 0.00 | 0.00 | 0.00 | 0.00 |
| TOTAL OF TX AND RX | | | | | | | | | 0.17 | 0.25 | 0.00 | 0.00 |

FIG. 17

| REFERENCE FREQUENCY | -1.5 % | -1.0 % | -0.5 % | -0.25 % | 0.25 % | 0.5 % | 1.0 % | 1.5 % | ±1.5 % | ±1.0 % | ±0.5 % | ±0.25 % | ±1.5 % | ±1.0 % | ±0.5 % | ±0.25 % |
|---|---|---|---|---|---|---|---|---|---|---|---|---|---|---|---|---|
| 210 | 206.9 | 207.9 | 209.0 | 209.5 | 210.5 | 211.1 | 212.1 | 213.2 | 0 % | 0 % | 0 % | 0 % | 0.00 | 0.00 | 0.00 | 0.00 |
| 225 | 221.6 | 222.8 | 223.9 | 224.4 | 225.6 | 226.1 | 227.3 | 228.4 | 0 % | 0 % | 0 % | 0 % | 0.00 | 0.00 | 0.00 | 0.00 |
| 240 | 236.4 | 237.6 | 238.8 | 239.4 | 240.6 | 241.2 | 242.4 | 243.6 | 0 % | 0 % | 0 % | 0 % | 0.00 | 0.00 | 0.00 | 0.00 |
| 255 | 251.2 | 252.5 | 253.7 | 254.4 | 255.6 | 256.3 | 257.6 | 258.8 | 100 % | 100 % | 100 % | 58 % | 0.17 | 0.25 | 0.50 | 0.58 |
| 270 | 266.0 | 267.3 | 268.7 | 269.3 | 270.7 | 271.4 | 272.7 | 274.1 | 0 % | 0 % | 0 % | 0 % | 0.00 | 0.00 | 0.00 | 0.00 |
| 285 | 280.7 | 282.2 | 283.6 | 284.3 | 285.7 | 286.4 | 287.9 | 289.3 | 0 % | 0 % | 0 % | 0 % | 0.00 | 0.00 | 0.00 | 0.00 |
| 300 | 295.5 | 297.0 | 298.5 | 299.3 | 300.8 | 301.5 | 303.0 | 304.5 | 0 % | 0 % | 0 % | 0 % | 0.00 | 0.00 | 0.00 | 0.00 |
| 315 | 310.3 | 311.9 | 313.4 | 314.2 | 315.8 | 316.6 | 318.2 | 319.7 | 0 % | 0 % | 0 % | 0 % | 0.00 | 0.00 | 0.00 | 0.00 |
| 330 | 325.1 | 326.7 | 328.4 | 329.2 | 330.8 | 331.7 | 333.3 | 335.0 | 0 % | 0 % | 0 % | 0 % | 0.00 | 0.00 | 0.00 | 0.00 |
| 345 | 339.8 | 341.6 | 343.3 | 344.1 | 345.9 | 346.7 | 348.5 | 350.2 | 0 % | 0 % | 0 % | 0 % | 0.00 | 0.00 | 0.00 | 0.00 |
| 360 | 354.6 | 356.4 | 358.2 | 359.1 | 360.9 | 361.8 | 363.6 | 365.4 | 61 % | 0 % | 0 % | 0 % | 0.00 | 0.00 | 0.00 | 0.00 |
| 375 | 369.4 | 371.3 | 373.1 | 374.1 | 375.9 | 376.9 | 378.8 | 380.6 | 0 % | 0 % | 0 % | 0 % | 0.00 | 0.00 | 0.00 | 0.00 |
| 390 | 384.2 | 386.1 | 388.1 | 389.0 | 391.0 | 392.0 | 393.9 | 395.9 | 0 % | 0 % | 0 % | 0 % | 0.00 | 0.00 | 0.00 | 0.00 |
| 405 | 398.9 | 401.0 | 403.0 | 404.0 | 406.0 | 407.0 | 409.1 | 411.1 | 0 % | 0 % | 0 % | 0 % | 0.00 | 0.00 | 0.00 | 0.00 |
| 420 | 413.7 | 415.8 | 417.9 | 419.0 | 421.1 | 422.1 | 424.2 | 426.3 | 0 % | 0 % | 0 % | 0 % | 0.00 | 0.00 | 0.00 | 0.00 |
| TOTAL OF RX ONLY | | | | | | | | | | | | | 0.17 | 0.25 | 0.50 | 0.58 |
| TOTAL OF TX AND RX | | | | | | | | | | | | | 0.27 | 0.25 | 0.50 | 0.58 |

FIG. 18

| 15 MHz | 30 MHz | 60 MHz | 120 MHz | 240 MHz | WEIGHT | 3 % | 2 % | 1 % | 0.5 % |
|---|---|---|---|---|---|---|---|---|---|
| 2325 | | | | | 1 | 0.17 | 0.25 | 0.50 | 1.00 |
| 2340 | 2340 | 2340 | 2340 | | 3 | 0.50 | 0.75 | 1.50 | 3.00 |
| 2355 | | | | | 1 | 0.17 | 0.25 | 0.50 | 1.00 |
| 2370 | 2370 | | | | 2 | 0.33 | 0.50 | 1.00 | 2.00 |
| 2385 | | | | | 1 | 0.17 | 0.25 | 0.50 | 1.00 |
| 2400 | 2400 | 2400 | 2400 | 2400 | 7 | 1.17 | 1.75 | 3.50 | 7.00 |
| 2415 | | | | | 3 | 0.50 | 0.75 | 1.50 | 3.00 |
| 2430 | 2430 | | | | 4 | 0.67 | 1.00 | 2.00 | 4.00 |
| 2445 | | | | | 3 | 0.50 | 0.75 | 1.50 | 3.00 |
| 2460 | 2460 | 2460 | | | 5 | 0.83 | 1.25 | 2.50 | 5.00 |
| 2475 | | | | | 3 | 0.50 | 0.75 | 1.50 | 3.00 |
| 2490 | 2490 | | | | 2 | 0.33 | 0.50 | 1.00 | 2.00 |
| 2505 | | | | | 1 | 0.17 | 0.25 | 0.50 | 1.00 |
| 2520 | 2520 | 2520 | 2520 | | 4 | 0.67 | 1.00 | 2.00 | 4.00 |
| 2535 | | | | | 1 | 0.17 | 0.25 | 0.50 | 1.00 |
| 2550 | 2550 | | | | 2 | 0.33 | 0.50 | 1.00 | 2.00 |
| 2565 | | | | | 1 | 0.17 | 0.25 | 0.50 | 1.00 |
| 2580 | 2580 | 2580 | | | 3 | 0.50 | 0.75 | 1.50 | 3.00 |
| 2595 | | | | | 1 | 0.17 | 0.25 | 0.50 | 1.00 |
| 2610 | 2610 | | | | 2 | 0.33 | 0.50 | 1.00 | 2.00 |
| 2625 | | | | | 1 | 0.17 | 0.25 | 0.50 | 1.00 |
| 2640 | 2640 | 2640 | 2640 | 2640 | 5 | 0.83 | 1.25 | 2.50 | 5.00 |

FIG. 19

| REFERENCE FREQUENCY | -3 % | -2 % | -1 % | -0.50 % | 3 % | 2 % | 1 % | 0.50 % | 3 % | 0.02 | 1 % | 0.50 % |
|---|---|---|---|---|---|---|---|---|---|---|---|---|
| 2325 | 2255.8 | 2278.5 | 2301.8 | 2313.4 | 0 % | 0 % | 0 % | 0 % | 0.00 | 0.00 | 0.00 | 0.00 |
| 2340 | 2269.8 | 2293.2 | 2316.6 | 2328.3 | 0 % | 0 % | 0 % | 0 % | 0.00 | 0.00 | 0.00 | 0.00 |
| 2355 | 2284.4 | 2307.9 | 2331.5 | 2343.2 | 0 % | 0 % | 0 % | 0 % | 0.00 | 0.00 | 0.00 | 0.00 |
| 2370 | 2298.9 | 2322.6 | 2346.3 | 2358.2 | 0 % | 0 % | 0 % | 0 % | 0.00 | 0.00 | 0.00 | 0.00 |
| 2385 | 2313.5 | 2337.3 | 2361.2 | 2373.1 | 0 % | 0 % | 0 % | 0 % | 0.00 | 0.00 | 0.00 | 0.00 |
| 2400 | 2328.0 | 2352.0 | 2376.0 | 2388.0 | 0 % | 0 % | 0 % | 0 % | 0.00 | 0.00 | 0.00 | 0.00 |
| 2415 | 2342.6 | 2366.7 | 2390.9 | 2402.9 | 18 % | 18 % | 18 % | 14 % | 0.06 | 0.09 | 0.18 | 0.29 |
| 2430 | 2357.1 | 2381.4 | 2405.7 | 2417.9 | 36 % | 36 % | 29 % | 15 % | 0.18 | 0.27 | 0.44 | 0.44 |
| 2445 | 2371.7 | 2396.1 | 2420.6 | 2432.8 | 54 % | 54 % | 29 % | 15 % | 0.18 | 0.27 | 0.29 | 0.29 |
| 2460 | 2386.2 | 2410.8 | 2435.4 | 2447.7 | 72 % | 59 % | 29 % | 15 % | 0.48 | 0.59 | 0.59 | 0.59 |
| 2475 | 2400.8 | 2425.5 | 2450.3 | 2462.6 | 89 % | 59 % | 30 % | 15 % | 0.30 | 0.30 | 0.30 | 0.30 |
| 2490 | 2415.3 | 2440.2 | 2465.1 | 2477.6 | 82 % | 52 % | 22 % | 7 % | 0.27 | 0.26 | 0.22 | 0.14 |
| 2505 | 2429.9 | 2454.9 | 2480.0 | 2492.5 | 64 % | 34 % | 4 % | 0 % | 0.11 | 0.09 | 0.02 | 0.00 |
| 2520 | 2444.4 | 2469.6 | 2494.8 | 2507.4 | 47 % | 17 % | 0 % | 0 % | 0.31 | 0.17 | 0.00 | 0.00 |
| 2535 | 2459.0 | 2484.3 | 2509.7 | 2522.3 | 29 % | 0 % | 0 % | 0 % | 0.05 | 0.00 | 0.00 | 0.00 |
| 2550 | 2473.5 | 2499.0 | 2524.5 | 2537.3 | 12 % | 0 % | 0 % | 0 % | 0.04 | 0.00 | 0.00 | 0.00 |
| 2565 | 2488.1 | 2513.7 | 2539.4 | 2552.2 | 0 % | 0 % | 0 % | 0 % | 0.00 | 0.00 | 0.00 | 0.00 |
| 2580 | 2502.6 | 2528.4 | 2554.2 | 2567.1 | 0 % | 0 % | 0 % | 0 % | 0.00 | 0.00 | 0.00 | 0.00 |
| TOTAL OF TX AND RX | | | | | | | | | 1.98 | 2.03 | 2.04 | 2.05 |

FIG. 20

| REFERENCE FREQUENCY | 3 % | 2 % | 1 % | 0.50 % | 3 % | 2 % | 1 % | 0.50 % | 3 % | 0.02 | 1 % | 0.50 % |
|---|---|---|---|---|---|---|---|---|---|---|---|---|
| 2325 | 2394.8 | 2371.5 | 2348.3 | 2336.6 | 0 % | 0 % | 0 % | 0 % | 0.00 | 0.00 | 0.00 | 0.00 |
| 2340 | 2410.2 | 2386.8 | 2363.4 | 2351.7 | 12 % | 0 % | 0 % | 0 % | 0.06 | 0.00 | 0.00 | 0.00 |
| 2355 | 2425.7 | 2402.1 | 2378.6 | 2366.8 | 31 % | 3 % | 0 % | 0 % | 0.05 | 0.01 | 0.00 | 0.00 |
| 2370 | 2441.1 | 2417.4 | 2393.7 | 2381.9 | 49 % | 21 % | 0 % | 0 % | 0.16 | 0.10 | 0.05 | 0.00 |
| 2385 | 2456.6 | 2432.7 | 2408.9 | 2396.9 | 68 % | 39 % | 11 % | 0 % | 0.11 | 0.10 | 1.01 | 0.00 |
| 2400 | 2472.0 | 2448.0 | 2424.0 | 2412.0 | 86 % | 57 % | 29 % | 14 % | 1.01 | 1.01 | 1.01 | 1.01 |
| 2415 | 2487.5 | 2463.3 | 2439.2 | 2427.1 | 82 % | 58 % | 29 % | 14 % | 0.27 | 0.29 | 0.29 | 0.29 |
| 2430 | 2502.9 | 2478.6 | 2454.3 | 2442.2 | 64 % | 58 % | 29 % | 15 % | 0.32 | 0.44 | 0.44 | 0.44 |
| 2445 | 2518.4 | 2493.9 | 2469.5 | 2457.2 | 46 % | 46 % | 29 % | 15 % | 0.15 | 0.23 | 0.29 | 0.29 |
| 2460 | 2533.8 | 2509.2 | 2484.6 | 2472.3 | 28 % | 28 % | 28 % | 15 % | 0.19 | 0.28 | 0.56 | 0.59 |
| 2475 | 2549.3 | 2524.5 | 2499.8 | 2487.4 | 10 % | 10 % | 10 % | 10 % | 0.03 | 0.05 | 0.10 | 0.20 |
| 2490 | 2564.7 | 2539.8 | 2514.9 | 2502.5 | 0 % | 0 % | 0 % | 0 % | 0.00 | 0.00 | 0.00 | 0.00 |
| 2505 | 2580.2 | 2555.1 | 2530.1 | 2517.5 | 0 % | 0 % | 0 % | 0 % | 0.00 | 0.00 | 0.00 | 0.00 |
| 2520 | 2595.6 | 2570.4 | 2545.2 | 2532.6 | 0 % | 0 % | 0 % | 0 % | 0.00 | 0.00 | 0.00 | 0.00 |
| 2535 | 2611.1 | 2585.7 | 2560.4 | 2547.7 | 0 % | 0 % | 0 % | 0 % | 0.00 | 0.00 | 0.00 | 0.00 |
| 2550 | 2626.5 | 2601.0 | 2575.5 | 2562.8 | 0 % | 0 % | 0 % | 0 % | 0.00 | 0.00 | 0.00 | 0.00 |
| 2565 | 2642.0 | 2616.3 | 2590.7 | 2577.8 | 0 % | 0 % | 0 % | 0 % | 0.00 | 0.00 | 0.00 | 0.00 |
| 2580 | 2657.4 | 2631.6 | 2605.8 | 2592.9 | 0 % | 0 % | 0 % | 0 % | 0.00 | 0.00 | 0.00 | 0.00 |
| TOTAL OF TX AND RX | | | | | | | | | 2.36 | 2.50 | 2.74 | 2.82 |

FIG. 21

| REFERENCE FREQUENCY | -1.5 % | -1 % | -0.5 % | -0.25 % | 0.25 % | 0.50 % | 1.00 % | 1.50 % | ±1.5 % | ±1.0 % | ±0.5 % | ±0.25 % | ±1.5 % | ±1.0 % | ±0.5 % | ±0.25 % |
|---|---|---|---|---|---|---|---|---|---|---|---|---|---|---|---|---|
| 2325 | 2290.1 | 2301.8 | 2313.4 | 2319.2 | 2330.8 | 2336.6 | 2348.3 | 2359.9 | 0 % | 0 % | 0 % | 0 % | 0.00 | 0.00 | 0.00 | 0.00 |
| 2340 | 2304.9 | 2316.6 | 2328.3 | 2334.2 | 2345.9 | 2351.7 | 2363.4 | 2375.1 | 0 % | 0 % | 0 % | 0 % | 0.00 | 0.00 | 0.00 | 0.00 |
| 2355 | 2319.7 | 2331.5 | 2343.2 | 2349.1 | 2360.9 | 2366.8 | 2378.6 | 2390.3 | 0 % | 0 % | 0 % | 0 % | 0.00 | 0.00 | 0.00 | 0.00 |
| 2370 | 2334.5 | 2346.3 | 2358.2 | 2364.1 | 2375.9 | 2381.9 | 2393.7 | 2405.6 | 7 % | 0 % | 0 % | 0 % | 0.02 | 0.03 | 0.00 | 0.00 |
| 2385 | 2349.2 | 2361.2 | 2373.1 | 2379.0 | 2391.0 | 2396.9 | 2408.9 | 2420.8 | 25 % | 11 % | 0 % | 0 % | 0.04 | 0.50 | 0.50 | 0.50 |
| 2400 | 2364.0 | 2376.0 | 2388.0 | 2394.0 | 2406.0 | 2412.0 | 2424.0 | 2436.0 | 43 % | 29 % | 14 % | 7 % | 0.50 | 0.23 | 0.29 | 0.29 |
| 2415 | 2378.8 | 2390.9 | 2402.9 | 2409.0 | 2421.0 | 2427.1 | 2439.2 | 2451.2 | 61 % | 47 % | 29 % | 14 % | 0.20 | 0.44 | 0.44 | 0.44 |
| 2430 | 2393.6 | 2405.7 | 2417.9 | 2423.9 | 2436.1 | 2442.2 | 2454.3 | 2466.5 | 80 % | 58 % | 29 % | 15 % | 0.40 | 0.29 | 0.29 | 0.29 |
| 2445 | 2408.3 | 2420.6 | 2432.8 | 2438.9 | 2451.1 | 2457.2 | 2469.5 | 2481.7 | 88 % | 59 % | 29 % | 15 % | 0.29 | 0.58 | 0.59 | 0.59 |
| 2460 | 2423.1 | 2435.4 | 2447.7 | 2453.9 | 2466.2 | 2472.3 | 2484.6 | 2496.9 | 72 % | 58 % | 29 % | 15 % | 0.48 | 0.20 | 0.25 | 0.30 |
| 2475 | 2437.9 | 2450.3 | 2462.6 | 2468.8 | 2481.2 | 2487.4 | 2499.8 | 2512.1 | 55 % | 40 % | 25 % | 15 % | 0.18 | 0.11 | 0.07 | 0.00 |
| 2490 | 2452.7 | 2465.1 | 2477.6 | 2483.8 | 2496.2 | 2502.5 | 2514.9 | 2527.4 | 37 % | 22 % | 7 % | 0 % | 0.12 | 0.01 | 0.00 | 0.00 |
| 2505 | 2467.4 | 2480.0 | 2492.5 | 2498.7 | 2511.3 | 2517.5 | 2530.1 | 2542.6 | 19 % | 4 % | 0 % | 0 % | 0.03 | 0.00 | 0.00 | 0.00 |
| 2520 | 2482.2 | 2494.8 | 2507.4 | 2513.7 | 2526.3 | 2532.6 | 2545.2 | 2557.8 | 2 % | 0 % | 0 % | 0 % | 0.01 | 0.00 | 0.00 | 0.00 |
| 2535 | 2497.0 | 2509.7 | 2522.3 | 2528.7 | 2541.3 | 2547.7 | 2560.4 | 2573.0 | 0 % | 0 % | 0 % | 0 % | 0.00 | 0.00 | 0.00 | 0.00 |
| 2550 | 2511.8 | 2524.5 | 2537.3 | 2543.6 | 2556.4 | 2562.8 | 2575.5 | 2588.3 | 0 % | 0 % | 0 % | 0 % | 0.00 | 0.00 | 0.00 | 0.00 |
| 2565 | 2526.5 | 2539.4 | 2552.2 | 2558.6 | 2571.4 | 2577.8 | 2590.7 | 2603.5 | 0 % | 0 % | 0 % | 0 % | 0.00 | 0.00 | 0.00 | 0.00 |
| 2580 | 2541.3 | 2554.2 | 2567.1 | 2573.6 | 2586.5 | 2592.9 | 2605.8 | 2618.7 | 0 % | 0 % | 0 % | 0 % | 0.00 | 0.00 | 0.00 | 0.00 |
| TOTAL OF TX AND RX | | | | | | | | | | | | | 2.29 | 2.39 | 2.43 | 2.41 |

FIG. 22A

| SPREADING MODE | DOWN | | | | CENTER | | | | UP | | | |
|---|---|---|---|---|---|---|---|---|---|---|---|---|
| SPREADING RATE | 3 % | 2 % | 1 % | 0.50 % | 3 % | 2 % | 1 % | 0.50 % | 3 % | 2 % | 1 % | 0.50 % |
| LAN (RX) | 0.198 | 0.203 | 0.204 | 0.205 | 0.229 | 0.239 | 0.243 | 0.241 | 0.236 | 0.250 | 0.274 | 0.282 |
| PHONE (RX) | 0.17 | 0.25 | 0.5 | 1 | 0.17 | 0.25 | 0.5 | 0.58 | 0 | 0 | 0 | 0 |
| TOTAL | 0.365 | 0.453 | 0.704 | 1.205 | 0.408 | 0.489 | 0.743 | 0.820 | 0.236 | 0.250 | 0.274 | 0.282 |

FIG. 22B

| SPREADING MODE | DOWN | | | | CENTER | | | | UP | | | |
|---|---|---|---|---|---|---|---|---|---|---|---|---|
| SPREADING RATE | 3 % | 2 % | 1 % | 0.50 % | 3 % | 2 % | 1 % | 0.50 % | 3 % | 2 % | 1 % | 0.50 % |
| LAN (TX/RX) + PHONE (RX) | 0.198 | 0.203 | 0.204 | 0.205 | 0.229 | 0.239 | 0.243 | 0.241 | 0.236 | 0.250 | 0.274 | 0.282 |
| LAN (RX) + PHONE (TX/RX) | 0.50 | 0.25 | 0.5 | 1 | 0.27 | 0.25 | 0.50 | 0.58 | 0.17 | 0.25 | 0 | 0 |
| LAN (TX/RX) + PHONE (TX/RX) | 0.695 | 0.453 | 0.704 | 1.205 | 0.498 | 0.489 | 0.743 | 0.820 | 0.403 | 0.500 | 0.274 | 0.282 |

FIG. 22C

| | SETTING |
|---|---|
| LAN (RX) + PHONE (RX) | UP 3 % |
| PHONE (TX/RX) + LAN (RX) | UP 1 % |
| LAN (TX/RX) + PHONE (RX) | DOWN 3 % |
| PHONE (TX/RX) + LAN (TX/RX) | UP 1 % |

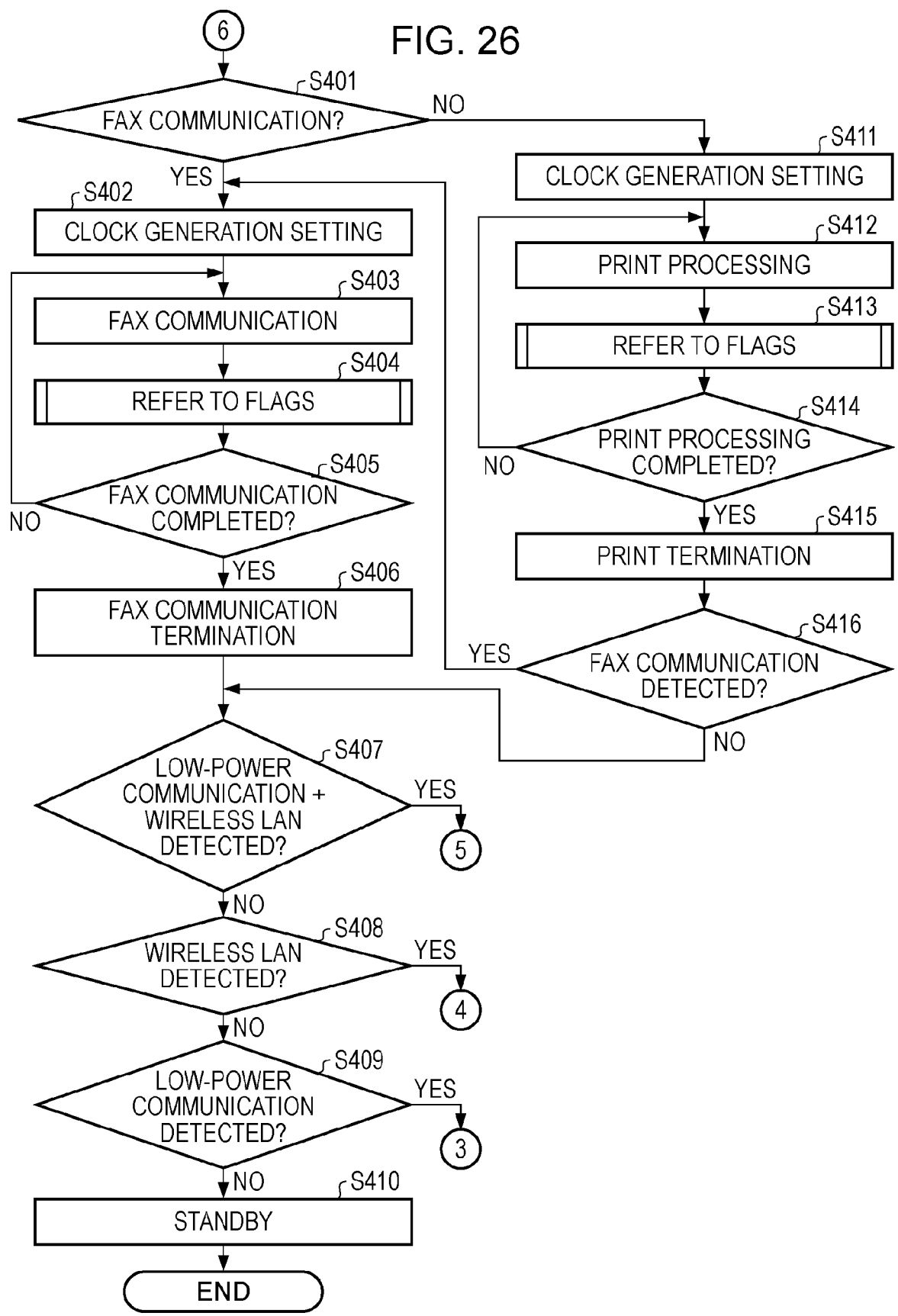

APPARATUS AND METHOD FOR CHANGING CLOCK FREQUENCY AND MODULATION METHOD BASED ON CURRENT STATE

BACKGROUND OF THE INVENTION

1. Field of the Invention

The present invention relates to an electronic apparatus with a wireless unit.

2. Description of the Related Art

Japanese Patent Laid-Open No. 2001-160788 discloses a notebook personal computer with a card slot, which can change the spreading rate of a spread spectrum clock generator (SSCG) based on information provided from a wireless unit mounted on the card slot.

Japanese Patent Laid-Open No. 2003-256069 discloses a recording apparatus in which an operating current of a central processing unit (CPU) that controls an electronic apparatus is detected, and an operating load on the CPU is determined based on the current. If the operating load is high, a multiplication factor is increased to increase the operating frequency of the CPU. If the operating load is low, the multiplication factor is reduced to reduce the operating frequency of the CPU.

Japanese Patent Laid-Open No. 2003-248524 discloses a large-scale integrated circuit (LSI) that can operate in a plurality of operating modes including a mode where the LSI operates at a relatively high frequency and a mode where the LSI operates at a relatively low frequency. Low power consumption of the LSI is achieved by dynamically and quickly controlling a clock state.

Japanese Patent Laid-Open No. 2001-160788 has a description of a single wireless unit that is mounted on the card slot of the personal computer, but has no description of use of a plurality of wireless units having different operating frequencies.

In Japanese Patent Laid-Open No. 2003-256069, the operating frequency is changed according to the load on the CPU. Therefore, a clock signal has different frequencies when multiple operations including wireless communication and recording are performed in parallel and when only wireless communication is performed. Thus, the level of electromagnetic interference (EMI) noise cannot be determined only based on the amount of load on the CPU. It is therefore difficult to suppress EMI noise in accordance with various states of the electronic apparatus.

SUMMARY OF THE INVENTION

According to an embodiment of an electronic apparatus with a wireless unit, it is desirable to reduce EMI noise and power consumption and to perform excellent wireless communication.

According to an aspect of the present invention, there is provided an electronic apparatus with a wireless unit, including a multiplier configured to receive a clock signal at a predetermined frequency and to generate a clock signal at any one of a plurality of frequencies; a modulator configured to modulate the frequency of the clock signal generated by the multiplier; and a controller configured to change the frequency of the clock signal generated by the multiplier and a modulation rate of the modulation performed by the modulator according to a state of the electronic apparatus.

Further features of the present invention will become apparent from the following description of exemplary embodiments with reference to the attached drawings.

BRIEF DESCRIPTION OF THE DRAWINGS

FIG. 3A is a block diagram of a main controller of the electronic apparatus, and FIG. 3B is a block diagram of an oscillation controller.

FIG. 6 is a table of the degrees of effect on the wireless phone frequencies.

FIG. 7 is a table of the degrees of effect on the wireless phone frequencies.

FIG. 8 is a table of the degrees of effect on the wireless phone frequencies.

FIG. 9 is a table of coefficients of effects on wireless phone frequencies.

FIG. 10 is a table of the degrees of effect on the wireless phone frequencies.

FIG. 11 is a table of the degrees of effect on the wireless phone frequencies.

FIG. 12 is a table of the degrees of effect on the wireless phone frequencies.

FIGS. 13A to 13C are tables of setting values relating to a clock signal.

FIG. 14 is a table of coefficients of effects on wireless local area network (LAN) frequencies.

FIG. 15 is a table of the degrees of effect on the wireless LAN frequencies.

FIG. 16 is a table of the degrees of effect on the wireless LAN frequencies.

FIG. 17 is a table of the degrees of effect on the wireless LAN frequencies.

FIG. 18 is a table of coefficients of effects on wireless LAN frequencies.

FIG. 19 is a table of the degrees of effect on the wireless LAN frequencies.

FIG. 20 is a table of the degrees of effect on the wireless LAN frequencies.

FIG. 21 is a table of the degrees of effect on the wireless LAN frequencies.

FIGS. 22A to 22c are tables of setting values relating to a clock signal.

FIG. 26 is a flowchart of a control operation.

DESCRIPTION OF THE EMBODIMENTS

Figure 1:
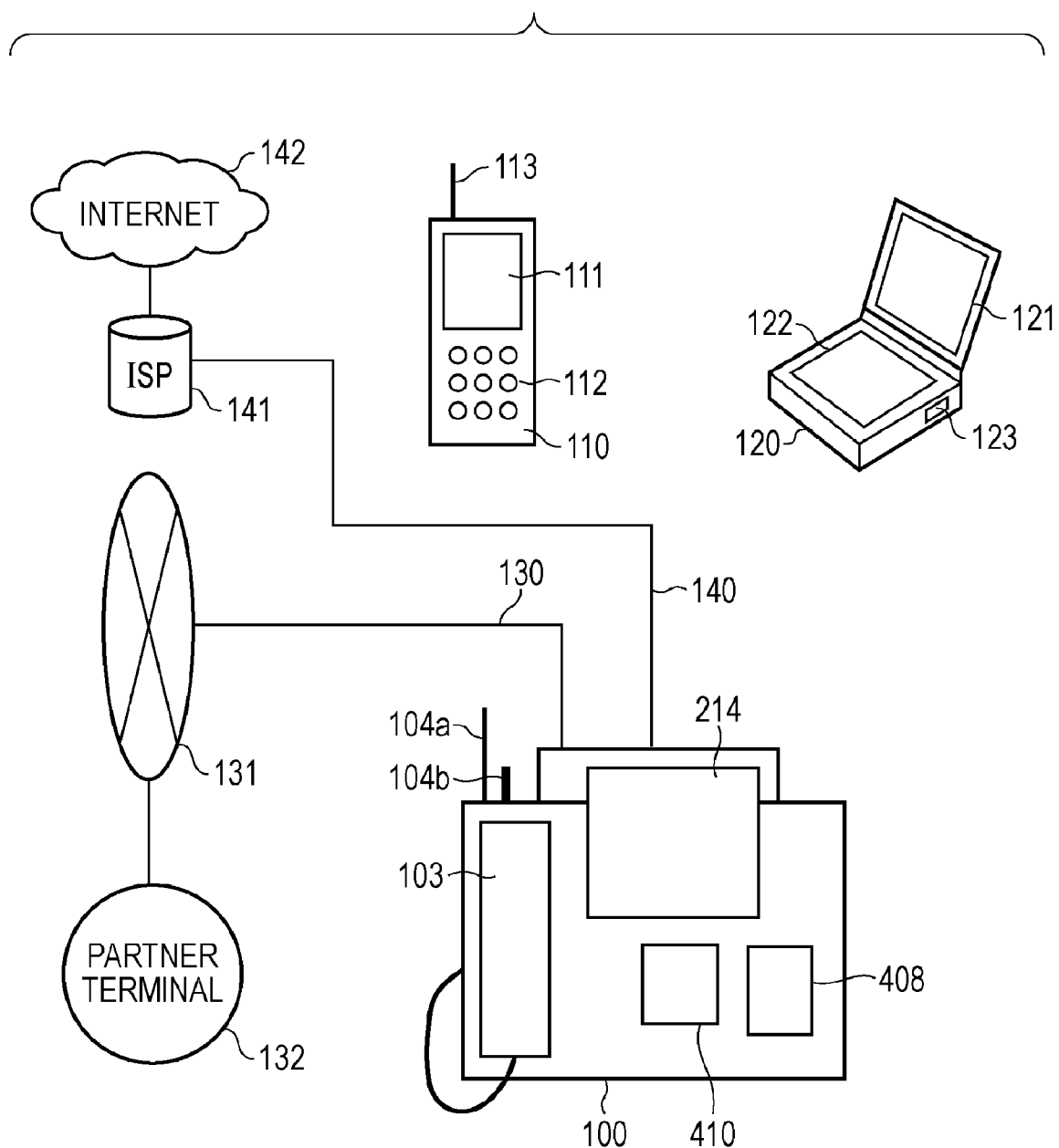
FIG. 1 is a diagram of an electronic apparatus according to an embodiment of the present invention.

FIG. 1 illustrates an electronic apparatus 100 according to an embodiment of the present invention. The electronic apparatus 100 includes a recording unit and a reading unit. Using recording data received from a computer 120, the electronic apparatus 100 can record an image on a recording sheet using the recording unit. The electronic apparatus 100 can also send image data that has been read using the reading unit to the computer 120. Furthermore, the electronic apparatus 100 has a facsimile function and a phone function. The electronic apparatus 100 can make and receive calls via a communication line 130. The electronic apparatus 100 has multiple functions. Regarding the phone function, the electronic apparatus 100 additionally has a wireless terminal (cordless handset)

110. The cordless handset 110 can make or receive calls via the electronic apparatus 100. The cordless handset 110 includes a display unit 111 that displays a phone number of a communication partner and operation keys 112 for entering a phone number of a communication partner. The cordless handset 110 includes a wireless phone antenna 113 for wirelessly communicating with the electronic apparatus 100. The electronic apparatus 100 includes a display unit 214 that displays a phone number of a communication partner. The electronic apparatus 100 includes operation keys 408 for entering a phone number of a communication partner and mode selection keys 410 for selecting a mode.

The electronic apparatus 100 is connected via a communication line 140 to the Internet 142. A server 141, which is an Internet service provider (ISP), is connected to the Internet 142. The electronic apparatus 100 can communicate with another computer 120 using a wireless LAN. The computer 120 is a notebook personal computer, which includes a display unit 121 and an operation unit 122.

The electronic apparatus 100 includes a wireless phone antenna 104a for wirelessly communicating with the terminal (cordless handset) 110 and a wireless LAN antenna 104b for wirelessly communicating with the computer 120.

Frequencies for wireless phones (low-power wireless communication) are different from frequencies for wireless LANs, which will be described later.

A partner terminal 132 can make and receive voice calls and, using a facsimile function, transfer images with the electronic apparatus 100 via a public network 131.

The terminal (cordless handset) 110 performs communication with the electronic apparatus 100 using a low-power wireless system. In order to distinguish this from a wireless LAN function, the expression "low-power wireless communication" is used. The computer 120 has a wireless LAN function and a wireless LAN antenna 123. Using this function, the computer 120 can send print data to the electronic apparatus 100 or receive read data from the electronic apparatus 100 without using the communication line 140.

Figure 2:
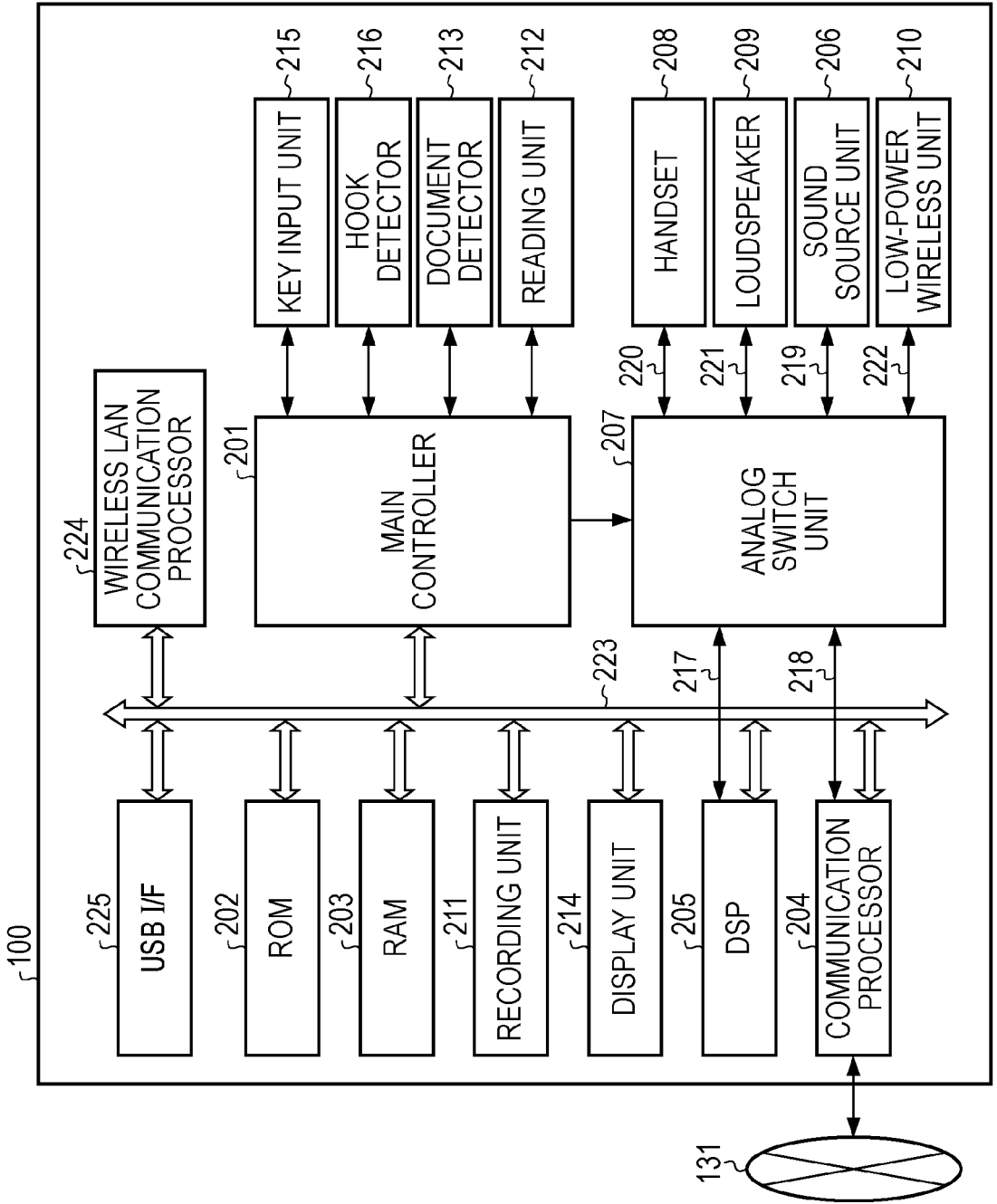
FIG. 2 is a block diagram of a control structure of the electronic apparatus.

FIG. 2 is a block diagram of the structure of the electronic apparatus 100. A main controller 201 controls the electronic apparatus 100. The main controller 201 controls the electronic apparatus 100 using a read-only memory (ROM) 202 and a random-access memory (RAM) 203.

A communication processor 204 controls communication with the public network 131. A recording unit 211 records an image on a recording medium using a recording head. A reading unit 212 reads an image of a document using a reading sensor.

The electronic apparatus 100 further includes a digital signal processor (DSP) 205, a sound source unit 206, an analog switch unit 207, a handset 208, a loudspeaker 209, and a low-power wireless unit 210. The electronic apparatus 100 further includes a document detector 213, the display unit 214, a key input unit 215, a hook detector 216, analog signals 217, analog signals 218, holding tones 219, and analog signals 220. The electronic apparatus 100 generates an analog sound 221 and analog signals 222 and includes an address bus/data bus 223, a wireless LAN communication processor 224, and a universal serial bus (USB) interface (I/F) 225.

FIG. 3A illustrates the outline of the main controller 201. FIG. 3B illustrates the structure of an oscillation controller.

An oscillation circuit (OSC) 301 generates a clock signal at 30 MHz. An oscillation controller 302 includes a multiplier circuit 3021 and a spread spectrum clock generator (SSCG) 3022. Based on a signal input from a CPU 306, the multiplier circuit 3021 performs multiplication, and the SSCG 3022 performs frequency modulation.

For example, the multiplier circuit 3021 generates a clock signal at 1 MHz from a clock signal at 30 MHz, multiplies the clock signal at 1 MHz by 192 times using phase-locked loop (PLL) processing, and generates a clock signal at 192 MHz. Furthermore, the SSCG 3022 performs frequency modulation of the generated clock signal at 192 MHz.

The main controller 201 further includes a first frequency divider 303, a second frequency divider 304, a selector 305, the CPU 306, bus controllers 307, input/output (I/O) controllers 308, a timer controller 309, and application specific integrated circuits (ASICs) 310. In the present embodiment, the number of the bus controllers 307, the number of the I/O controllers 308, and the number of the ASICs 310 is three.

The OSC 301 generates a reference clock signal for control circuits. The frequency divider 303 divides the frequency of a clock signal whose frequency has been spread (clock is modulated) by the SSCG 3022 of the oscillation controller 302.

The second frequency divider 304 divides the frequency of a clock signal which is a reference clock signal from the oscillation controller 302 whose frequency has not been spread by the SSCG 3022. This is because there are some circuits (e.g., the USB I/F 225) in the electronic apparatus 100 that require unspread clock signals.

The selector 305 individually selects one of the frequency-divided clock signals obtained by the frequency divider 303 and the second frequency divider 304 for respective blocks.

The CPU 306 controls the electronic apparatus 100.

The bus controllers 307 control, for the ROM 202 and the RAM 203, access arbitration of the DSP 205 and the CPU 306 and direct memory access (DMA) transfer.

The CPU 306 performs input/output control of the key input unit 215, the hook detector 216, and the document detector 213 via the I/O controllers 308 and controls communication with the display unit 214, the analog switch unit 207, and the communication processor 204 via the I/O controllers 308.

The timer controller 309 generates a timing signal for the CPU 306 to use an internal timer. The timer controller 309 operates using the clock signal at 30 MHz, which is generated by the OSC 301.

As has been described above, the main controller 201 controls the electronic apparatus 100 in accordance with control programs stored in the ROM 202.

The ROM 202 stores, for example, a control program for the low-power wireless unit 210 which communicates with the terminal (cordless handset) 110, a control program for the wireless LAN communication processor 224 which performs communication with a wireless LAN, and a program for controlling a facsimile modem.

The ROM 202 further stores a control program for the reading unit 212 and a control program for the recording unit 211. The ROM 202 is, for example, a flash ROM.

The RAM 203 is a memory used by the main controller 201 to perform processing. The RAM 203 is not only used by the CPU 306 as a work area, but also the RAM 203 is backed up by a battery or the like and stores text messages created and received, detailed settings of various service functions, and details registered in a phone directory.

The communication processor 204 is a communication interface with the public network 131. When the public network 131 includes analog lines, the communication processor 204 is connected to a phone line of a switchboard (hereinafter called a "subscriber line"). The communication processor 204 has a polarity matching circuit for matching the polarity of line voltages and a ringer detection circuit for detecting a ringing signal from the switchboard.

The public network 131 may include, besides analog lines, digital lines such as an integrated services digital network (ISDN).

Under control of the main controller 201, the DSP 205 realizes the following functions: a data modem function of sending and receiving electronic mail (E-mail) messages, and a facsimile modem function of sending and receiving facsimiles using G3 FAX.

The sound source unit 206 is a sound source of a holding tone and a ringer melody. The sound source unit 206 contains sound source data. Under control of the main controller 201, the sound source unit 206 outputs an analog signal. In addition, the sound source unit 206 is a sound source for outputting call progress tones including a dial tone (DT), a busy tone (BT), and a ring back tone (RBT).

Under control of the main controller 201, the analog switch unit 207 switches signals from the DSP 205 or switches analog input/output signals from the sound source unit 206, the handset 208, and the loudspeaker 209 to the communication processor 204. The analog switch unit 207 contains an attenuator to change the level of an analog signal.

The handset 208 receives and outputs sounds. The loudspeaker 209 outputs a ringing tone and stored audio data and monitors facsimile communication.

The low-power wireless unit 210 modulates an audio signal into a format that can be transmitted wirelessly and sends the modulated signal to the antenna 104. The low-power wireless unit 210 demodulates wireless data received at the antenna 104 to obtain an analog audio signal or a control signal, and outputs the control signal to the main controller 201 and the analog audio signal to the analog switch unit 207.

The recording unit 211 includes a known printer, such as a thermal or heat-transfer printer, a laser beam printer, or an inkjet printer. The recording unit 211 decodes digital data encoded in a modified Huffman (MH), modified read (MR), modified MR (MMR) format and prints the decoded data as print data. The recording unit 211 receives data provided from the wireless LAN communication processor 224 or the USB I/F 225 and uses the provided data for printing.

The reading unit 212 has a known document reader, such as a charge-coupled device (CCD) or a contacting sensor array. The reading unit 212 converts analog data obtained by the reader into digital data, encodes the digital data in a known encoding format, such as MH, MR, and MMR, and outputs the encoded data.

The document detector 213 detects the presence of a document to be transmitted, which is placed on the reading unit 212, and sends a notification of the detection result to the main controller 201.

The display unit 214 displays the time, the state of a line in communication, the state of an error, or the like. The display unit 214 mainly includes a liquid crystal display (LCD) or the like. The display unit 214 additionally displays text messages entered using keys of the key input unit 215 and text messages received. Furthermore, the display unit 214 displays the detailed settings of various service functions of the phone. The display unit 214 includes an LCD (thin-film transistor (TFT) or dual-scan super twisted nematic (DSTN)) for displaying data, a backlight for enabling color display, and an inverter. According to the setting of the main controller 201, the display unit 214 controls the inverter and a driver to stop displaying data when no instruction is entered using keys for a predetermined time.

Figures 4, 5:
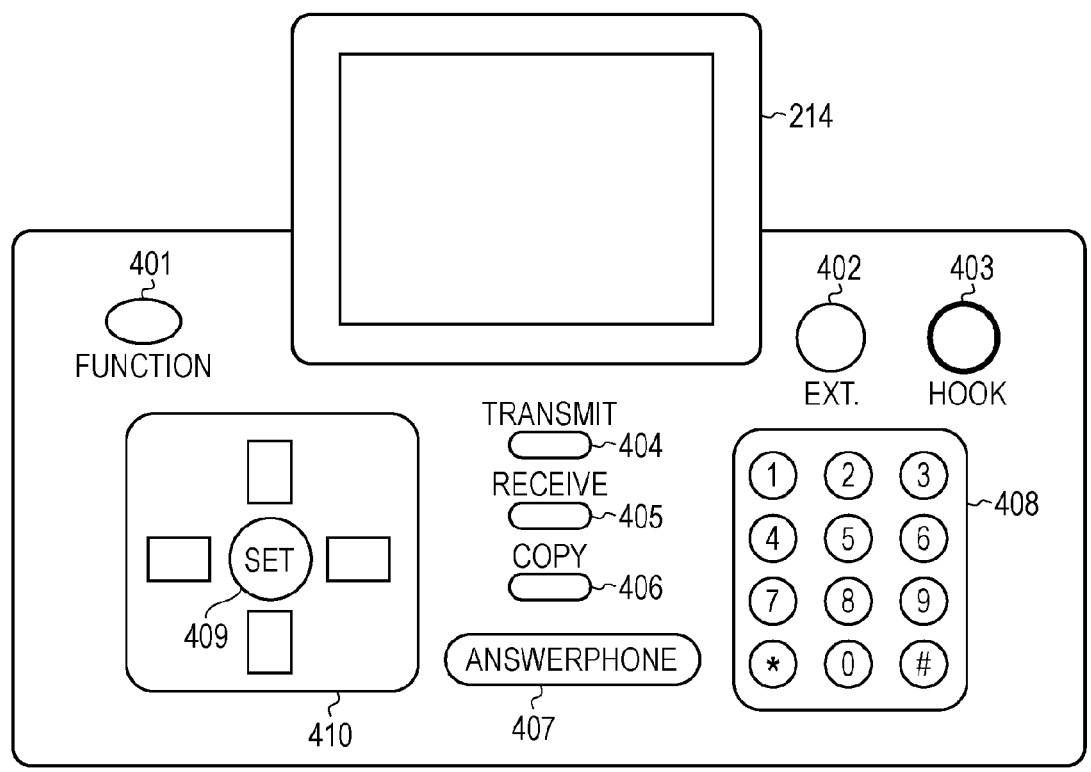
FIG. 4 is an illustration of a key input unit of the electronic apparatus.
FIG. 5 is a table of coefficients of effects on wireless phone frequencies.

FIG. 4 illustrates the key input unit 215 of the electronic apparatus 100. The key input unit 215 includes keys indicating 0 to 9, *, #, and the like. That is, the key input unit 215 includes dial keys 408 for entering a number of a communication destination, a transmission (Tx) key 404 for entering a facsimile transmission instruction, and a reception (Rx) key 405 for entering a facsimile reception instruction. The key input unit 215 further includes an off hook key 403 for controlling on/off of the line, an answerphone key 407 for setting an answerphone, and an extension key 402 to be pressed to make a call and start conversation with the terminal (cordless handset) 110. Furthermore, the key input unit 215 includes a function key 401 for setting a function setting, a set key 409, and the mode selection keys 410. When the function key 401 is pressed to switch to a function selection mode, the set key 409 and the selection keys 410 are used to select and set the mode.

Referring to FIG. 2, the hook detector 216 particularly detects the on/off state of a handset 103 and controls on/off of the line. The hook detector 216 also monitors the hook key 403 to detect the on-hook state indicating the start of a call and the off-hook state indicating the end of a call.

The analog signals 217 include an analog signal output from the DSP 205 and an analog signal input to the DSP 205. The analog signals 218 include an analog signal output from the communication processor 204 and an analog signal input to the communication processor 204. The holding tones 219 include a holding tone output from the sound source unit 206, call progress tones including DT, BT, and RBT, and a 16-tone ringer melody.

The analog signals 220 include an analog signal output from the handset 208 and an analog signal input to the handset 208. The analog sound 221 is output to the loudspeaker 209. The analog signals 222 include an analog signal output from the low-power wireless unit 210 and an analog signal input to the low-power wireless unit 210.

The address bus/data bus 223 is used by the main controller 201 to set settings of various components.

When the wireless LAN communication processor 224 detects that the main controller 201 has received wireless frames, the wireless LAN communication processor 224 decomposes Transmission Control Protocol/Internet Protocol (TCT/IP) frames in the data and expands print data in the RAM 203.

The USB I/F 225 is connected to a personal computer via a USB cable. When the main controller 201 receives print data, the USB I/F 225 expands the print data as raster data in the RAM 203.

Next, the frequency modulation performed using the SSCG 3022 of the oscillation controller 302 is described.

The SSCG 3022 has three frequency modulation modes (spreading modes). More specifically, these frequency modulation modes include a down spread mode of performing frequency modulation of a clock signal among a spectrum of frequencies below a reference frequency, an up spread mode of performing frequency modulation of a clock signal among a spectrum of frequencies above a reference frequency, and a center spread mode of performing frequency modulation of a clock signal among a spectrum of frequencies above and below a reference frequency.

In the down spread mode, the spreading rate can be selected from among −0.5%, −1%, −2%, and −3% relative to the reference frequency. In the up spread mode, the spreading rate can be selected from among +0.5%, +1%, +2%, and +3% relative to the reference frequency. In the center spread mode, the spreading rate can be selected from among ±0.5%, ±1.0%, and ±1.5% relative to the reference frequency.

FIG. 5 is a table showing the relationship between the maximum frequency of a clock signal used in the electronic apparatus 100 and clocks obtained by dividing that frequency.

Suppose that the maximum frequency of the electronic apparatus 100 (for example, the frequency of CLK1) is 192 MHz, and, when this frequency is divided, 96 MHz, 48 MHz, 24 MHz, and 12 MHz are obtained.

Frequencies used in communication with the terminal (cordless handset) 110 are as follows. That is, a transmission (Tx) frequency ranges from 380.2125 MHz to 381.3125 MHz, and a reception (Rx) frequency ranges from 253.8625 MHz to 254.9625 MHz.

The frequencies of the foregoing clock signals have only small effects on the frequency bands (Tx and Rx) used in wireless phone communication. However, when these frequencies are spread, there may be some effects on the frequency bands (Tx and Rx) used in wireless phone communication. In this case, the larger the number of clock signals in each of the frequency bands (Tx and Rx), the larger the effect. It is assumed that the number of clock signals in each of the frequency bands (Tx and Rx) is a coefficient. In other words, weighting is performed using the number of clock signals in each of the frequency bands (Tx and Rx).

Frequencies used in calculating the coefficient are frequencies obtained by frequency division. For example, besides 12 MHz, additionally 24 MHz, 24 MHz, 96 MHz, and 192 MHz are used.

Based on each of the above-described wireless phone communication frequency bands (Tx and Rx), a coefficient is obtained by paying attention to the divisors (excluding 1) of a reference frequency among the foregoing frequencies (12 MHz, 24 MHz, 48 MHz, 96 MHz, and 192 MHz).

For example, the divisors of 252 MHz include, among the foregoing frequency values, only 12. Thus, the weight is "1". Alternatively, this may be expressed as, for example, "coefficient (coefficient A)".

In another example, 384 MHz has, besides 1, five divisors (12, 24, 48, 96, and 192). Thus, the weight is "5".

It is also assumed that the strength of noise (level of energy) is different according to the spreading rate. Correction values are provided for the individual spreading rates. For example, the correction value for a spreading rate of 0.5% is 1; the correction value for a spreading rate of 1% is 0.5; the correction value for a spreading rate of 2% is 0.25; the correction value for a spreading rate of 3% is 0.167. In order to distinguish these correction values from the foregoing coefficients A, the correction values are called coefficients B. In addition, there is a coefficient C that indicates a rate at which the frequencies obtained by frequency modulation overlap each of the frequency bands (Tx and Rx).

The result of the multiplication of the coefficients A, B, and C is the "degree of effect of noise". In this 192-MHz system, the case where a frequency used in transmission is 384 MHz is described.

FIG. 6 is a table for illustrating the up spread mode where the clock signal is spread among a spectrum of frequencies above a reference frequency.

According to FIG. 6, when the clock signal is spread by 1% with respect to a reference frequency of 252 MHz, the frequency of the clock signal ranges from 252 MHz to 254.5 MHz. Since this overlaps part of the reception frequency band (253.8625 MHz to 254.9625 MHz), the coefficient C is expressed as 40%. That is, when the frequency is spread by 1%, this has an effect on reception.

Referring back to FIG. 5, the coefficient A is 1 at a frequency of 252 MHz. In the case where the spreading rate is 1%, the coefficient B is 0.5.

Thus, the degree of effect of noise is 0.2 (=1×0.5×40%).

When the clock signal is spread by 2%, the frequency of the clock signal ranges from 252 MHz to 257.0 MHz. Since this range completely overlaps the reception frequency band (253.8625 MHz to 254.9625 MHz), the coefficient C is expressed as 100%.

Referring back to FIG. 5, the coefficient A is 1 at a frequency of 252 MHz. In the case where the spreading rate is 2%, the coefficient B is 0.25.

Thus, the degree of effect of noise is 0.25 (=1×0.25×100%).

Accordingly, the relationship among the degrees of effect on the reception frequency band are as follows:

2% spreading>1% spreading>3% spreading>0.5% spreading

The reception frequency band has been described above. Next, the transmission frequency band is described. According to FIG. 6, when the clock signal is spread by 3% with respect to a reference frequency of 372 MHz, the frequency of the clock signal ranges from 372 MHz to 383.2 MHz. Since this range completely overlaps the transmission frequency band (380.2125 MHz to 381.3125 MHz), the coefficient C is expressed as 100%. That is, when the clock signal is spread by 3%, this has an effect on transmission. Under this condition, the degree of effect is 0.167 (1×0.167×100%=0.167).

Finally, the degrees of effect on transmission and reception are evaluated in a comprehensive manner. The relationship among the degrees of effect is as follows:

3% spreading>2% spreading>1% spreading>0.5% spreading

According to FIG. 6, the effect of noise on the wireless bands (Tx and Rx) in the case where the frequency has been spread is minimum when the spreading rate is 0.5%, and the value of the minimum effect is 0.

FIG. 7 is a table for illustrating the down spread mode where the clock signal is spread among a spectrum of frequencies below a reference frequency.

The effect of noise on the wireless bands (Tx and Rx) in the case where the frequency has been spread is minimum when the spreading rate is 0.5%, and the value of the minimum effect is 0.

FIG. 8 is a table for illustrating the center spread mode where the clock signal is spread among a spectrum of frequencies above and below a reference frequency.

The effect of noise on the wireless bands (Rx and Tx) in the case where the frequency has been spread is minimum when the spreading rate is 0.5% or 1%, and the value of the minimum effect is 0.

Next, a frequency band used in a wireless LAN when the frequency of a clock signal is 192 MHz is described.

A frequency band used in a wireless LAN ranges from 2400 MHz to 2483.5 MHz.

Similar to FIG. 5, FIG. 9 is a table showing the relationship between the maximum frequency of a clock signal used in the system and clocks obtained by dividing that frequency.

As in the case shown in FIG. 5, the larger the number of clock signals in the frequency band, the larger the effect. It is assumed that the number of clock signals in the frequency band is a coefficient. In other words, weighting is performed using the number of clock signals in the frequency band.

In addition to the foregoing description, common multiples of the frequencies obtained by dividing the clock signal have larger weights. For example, in the frequency band from 2400 MHz to 2483.5 MHz, frequencies such as 2400 MHz and 2412 MHz are common multiples of 12 MHz. Thus, for these frequencies, 2 is added to their weights.

For example, 2400 MHz has four divisors (12, 24, 48, and 96) excluding 1. Thus, the weight of 2400 MHz is 6, which is obtained by adding 2 to 4, which is the number of divisors. Similarly, 2412 MHz has one (12 MHz) divisor excluding 1.

Thus, the weight of 2412 MHz is 3, which is obtained by adding 2 to 1, which is the number of divisors.

In contrast, frequencies outside the band from 2400 MHz to 2483.5 MHz are the same as those shown in FIG. 5.

Since the effect of noise is similar to that in FIG. 5, a description thereof is omitted.

For example, correction values at 2400 MHz are as follows: the correction value for a spreading rate of 0.5% is 6; the correction value for a spreading rate of 1% is 3; the correction value for a spreading rate of 2% is 1.5; and the correction value for a spreading rate of 3% is 1.

FIG. 10 is a table for illustrating the down spread mode where the clock signal is spread among a spectrum of frequencies below a reference frequency.

According to FIG. 10, the effect of noise on the wireless band in the case where the frequency has been spread is minimum when the spreading rate is 3%, and the value of the minimum effect is 3.37.

FIG. 11 is a table for illustrating the up spread mode where the clock signal is spread among a spectrum of frequencies above a reference frequency.

According to FIG. 11, the effect of noise on the wireless band in the case where the frequency has been spread is minimum when the spreading rate is 3%, and the value of the minimum effect is 3.17.

FIG. 12 is a table for illustrating the center spread mode where the clock signal is spread among a spectrum of frequencies above and below a reference frequency.

According to FIG. 12, the effect of noise on the wireless band in the case where the frequency has been spread is minimum when the spreading rate is ±1.5%, and the value of the minimum effect is 3.7.

The above-described results shown in FIGS. 6 to 8 and FIGS. 10 to 12 are summarized in FIGS. 13A, 13B, and 13C.

FIGS. 13A, 13B, and 13C are tables summarizing a communication state of a wireless phone and a communication state of a wireless LAN when the electronic apparatus 100 is in an operating state or a standby state. The operating state is a state where, for example, the electronic apparatus 100 records data on a recording medium using a recording head or the electronic apparatus 100 reads an image of a document.

FIG. 13A is a table of the degrees of effect when the wireless phone and the wireless LAN are both in a reception state. In this case, it is clear from FIG. 13A that the degree of effect is small when the spreading rate in the down spread mode is 3%.

FIG. 13B is a table of the degrees of effect when the wireless LAN is in a transmission/reception state, when the wireless phone is in a transmission/reception state, and when the wireless phone and the wireless LAN are both in a transmission/reception state.

It is clear from FIG. 13B that, when the wireless LAN is in a transmission/reception state, the degree of effect is small when the spreading rate in the up spread mode is 3%.

When the wireless phone is in a transmission/reception state, the degree of effect is small when the spreading rate in the center spread mode is 0.5% or 1%.

When the wireless phone and the wireless LAN are both in a transmission/reception state, the degree of effect is small when the spreading rate in the down spread mode is 0.5%.

Therefore, the clock signal is spread according to the operating state of the wireless phone and the wireless LAN, as shown in FIG. 13C. When the wireless phone is in a transmission/reception state, the spreading rate in the center spread mode is selected to be 0.5% since the SSCG 3022 varies one to another. For example, the more the spreading rate becomes closer to 2%, the larger the degree of effect. In order to allow for variations, the spreading rate is set to 0.5%.

FIG. 14 is a table of the weights and the degrees of effect when the frequency of a clock signal used in the system in a power saving mode is 30 MHz. Points that are different from FIG. 5 are described, and similar points are only briefly described. FIG. 14 summarizes the frequencies of harmonics of 30 MHz and a frequency obtained by dividing 30 MHz.

In the power saving mode, the PLL function is turned off, and the system is operated based on the reference frequency 30 MHz of the OSC 301.

The manner of weighting is similar to that in FIG. 5. For example, the weight of 225 MHz is "1". The weight of 240 MHz is "5".

Energy of noise is similar to that in FIG. 5. A correction value when the spreading rate is 0.5% is 1. Correction values for spreading rates of 1%, 2%, and 3% are 0.5, 0.25, and 0.167, respectively.

The degrees of effect are calculated as follows. In the 30-MHz system, a frequency with the greatest degree of effect is 240 MHz. The degree of effect of 240 MHz is "5" when the spreading rate is 0.5%; the degree of effect is "2.5" when the spreading rate is 1%; the degree of effect is "1.25" when the spreading rate is 2%; and the degree of effect is "0.83" when the spreading rate is 3%.

FIG. 15 is a table for illustrating the down spread mode where the clock signal is spread among a spectrum of frequencies below a reference frequency.

It is clear from the table that, when the clock signal is spread with respect to 255 MHz by 0.5% or more, all of the spread frequencies are within a channel of the reception frequency band (Rx) of communication with the wireless terminal (handset) 110. When the clock signal is spread by 3%, the spread frequencies completely overlap the transmission frequency band (Tx).

According to FIG. 15, the effect of noise on the wireless bands (Tx and Rx) in the case where the frequency has been spread is minimum when the spreading rate is 2%, and the value of the minimum effect is 0.25.

FIG. 16 is a table for illustrating the up spread mode where the clock signal is spread among a spectrum of frequencies above a reference frequency.

According to FIG. 16, the effect of noise on the wireless bands (Tx and Rx) in the case where the frequency has been spread is minimum when the spreading rate is 1% or 0.5%, and the value of the minimum effect is 0.

FIG. 17 is a table for illustrating the center spread mode where the clock signal is spread among a spectrum of frequencies above and below a reference frequency.

According to FIG. 17, the effect of noise on the wireless bands (Tx and Rx) in the case where the frequency has been spread is minimum when the spreading rate is ±1%, and the value of the minimum effect is 0.25.

Next, a frequency band used in a wireless LAN when the frequency of a clock signal is 30 MHz is described. The frequency band used in the wireless LAN is 2400 MHz to 2483.5 MHz.

A condition described with reference to FIG. 18 is different from the foregoing condition. That is, harmonics of the frequency fall within the frequency band used in the wireless LAN. For example, 2400 MHz corresponds to the frequencies of harmonics of 15 MHz, 30 MHz, 60 MHz, 120 MHz, and 240 MHz. Frequencies that correspond to the frequencies of harmonics are 2400 MHz, 2415 MHz, 2430 MHz, 2445 MHz, 2460 MHz, and 2475 MHz. For these frequencies corresponding to the frequencies of harmonics, a constant (e.g., 2) is added to individually obtained weights.

For example, the weight of 2400 MHz is "7". The weight of 2415 MHz is "3".

FIG. 19 is a table for illustrating the down spread mode where the clock signal is spread among a spectrum of frequencies below a reference frequency.

According to FIG. 19, the effect of noise on the wireless band in the case where the frequency has been spread is minimum when the spreading rate is 3%, and the value of the minimum effect is 1.98.

FIG. 20 is a table for illustrating the up spread mode where the clock signal is spread among a spectrum of frequencies above a reference frequency.

According to FIG. 20, the effect of noise on the wireless band in the case where the frequency has been spread is minimum when the spreading rate is 3%, and the value of the minimum effect is 2.36.

FIG. 21 is a table for illustrating the center spread mode where the clock signal is spread among a spectrum of frequencies above and below a reference frequency.

According to FIG. 21, the effect of noise on the wireless band in the case where the frequency has been spread is minimum when the spreading rate is ±1.5%, and the value of the minimum effect is 2.29.

The above-described results shown in FIGS. 15 to 17 and FIGS. 19 to 21 are summarized in FIGS. 22A, 22B, and 22C.

FIGS. 22A, 22B, and 22C are tables summarizing a communication state of a wireless phone and a communication state of a wireless LAN when the electronic apparatus 100 is in a power saving state. In response to an operation entered by a user, the electronic apparatus 100 is switched to a standby state.

FIG. 22A is a table of the degrees of effect when the wireless phone and the wireless LAN are both in a reception state. In this case, it is clear from FIG. 22A that the degree of effect is small when the spreading rate in the up spread mode is 3%.

FIG. 22B is a table of the degrees of effect when the wireless LAN is in a transmission/reception state, when the wireless phone is in a transmission/reception state, and when the wireless phone and the wireless LAN are both in a transmission/reception state.

It is clear from FIG. 22B that, when the wireless LAN is in a transmission/reception state, the degree of effect is small when the spreading rate in the down spread mode is 3%.

When the wireless phone is in a transmission/reception state, the degree of effect is small when the spreading rate in the up spread mode is 1%.

When the wireless phone and the wireless LAN are both in a transmission/reception state, the degree of effect is small when the spreading rate in the up spread mode is 1%.

Therefore, the clock signal is spread according to the operating state of the wireless phone and the wireless LAN even when the electronic apparatus 100 is in the power saving mode, as shown in FIG. 22C.

FIGS. 23 to 26 illustrate control of a clock signal in the electronic apparatus 100.

Figure 23:
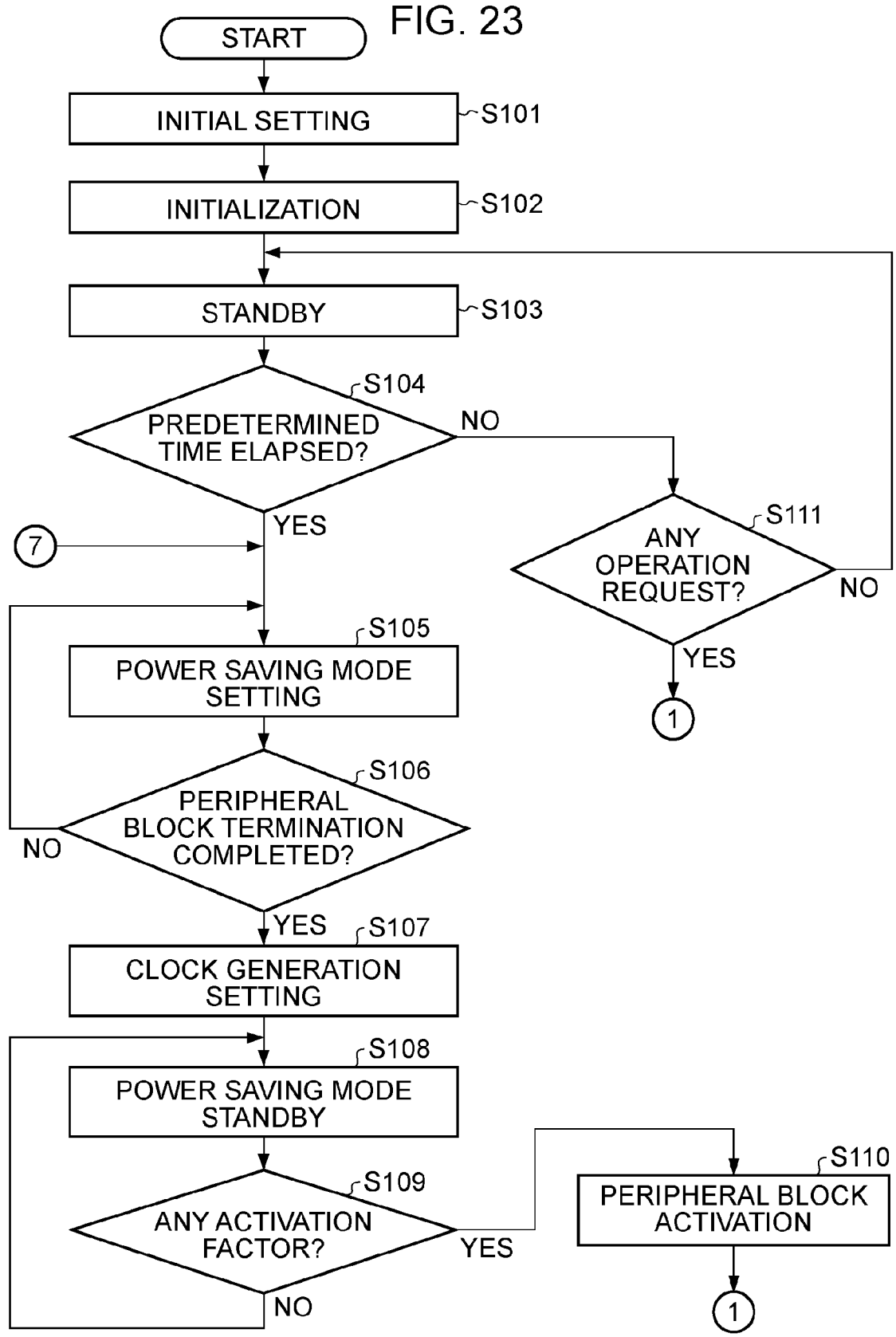
FIG. 23 is a flowchart of a control operation.

FIG. 23 is a flowchart of a control operation performed after power of the electronic apparatus 100 is turned on. When power of the electronic apparatus 100 is turned on, initial setting processing is performed (S101). The CPU 306 performs initial settings of the oscillation controller 302, the first frequency divider 303, the second frequency divider 304, and the selector 305. The CPU 306 turns on the PLL function of the oscillation controller 302, and sets the frequency of the oscillation controller 302 to 192 MHz. As shown in FIG. 13C, a clock signal CLK1 at 192 MHz which has been modulated at a spreading rate of 3% in the down spread mode is output.

In addition, a clock signal CLK2 which has not been spread is output. In step S102, initialization processing is performed. The electronic apparatus 100 is checked for various errors, and mechanical initial operations of the recording unit 211 and the reading unit 212 are performed.

After this processing is completed, the electronic apparatus 100 enters a standby state (S103). The CPU 306 outputs an instruction signal to the oscillation controller 302. The oscillation controller 302 changes the frequency of the clock signal to 48 MHz. However, the oscillation controller 302 does not change the spreading mode and the spreading rate.

The first frequency divider 303 divides the frequency of CLK1 to output CPU_CLK1 (48 MHz), ASIC_CLK1 (48 MHz), BusCLK1 (24 MHz), and I/OCLK1 (12 MHz). Using the selector 305, the CPU 306 selects CPU_CLK1 as CPU_CLK and receives CPU_CLK1. According to the settings in the CPU 306, BusCLK1 is supplied to the bus controllers 307, and I/OCLK1 is supplied to the I/O controllers 308. In this standby state, interruption signals from keys or sensors in peripheral blocks are monitored.

When the CPU 306 detects that a predetermined time has elapsed or, while monitoring interruption signals, detects that a predetermined time (such as five minutes) has elapsed (yes in S104), the CPU 306 sets the electronic apparatus 100 to a power saving mode (S105). With this setting, the backlight of the display unit 214 is turned off; oscillation of the inverter is terminated; power of the sensor is turned off; the DSP 205 enters a sleep mode; and output of a power supply is reduced. The CPU 306 determines whether the peripheral blocks are completely terminated (S106). When it is detected that the peripheral blocks are completely terminated (yes in S106), the CPU 306 performs clock generation setting processing shown in FIG. 22C (S107).

For example, the CPU 306 outputs an instruction signal to the oscillation controller 302. The oscillation controller 302 changes the frequency of the clock signal to 30 MHz, which corresponds to the standby state, and outputs a clock signal that has been modulated at a spreading rate of 3% in the up spread mode.

In the standby processing in the power saving mode (S108), the CPU 306 periodically monitors the peripheral blocks based on a signal from the timer controller 309. In step S109, whether an activation factor has occurred is determined. When no activation factor has occurred (no in S109), the standby processing in the power saving mode is performed (S108).

When there is an activation factor (yes in S109), in step S110, among the peripheral circuit blocks, circuit blocks relating to wireless communication start operating. If necessary, the blocks terminated when the mode has been switched to the power saving mode may start operating.

Figure 24:
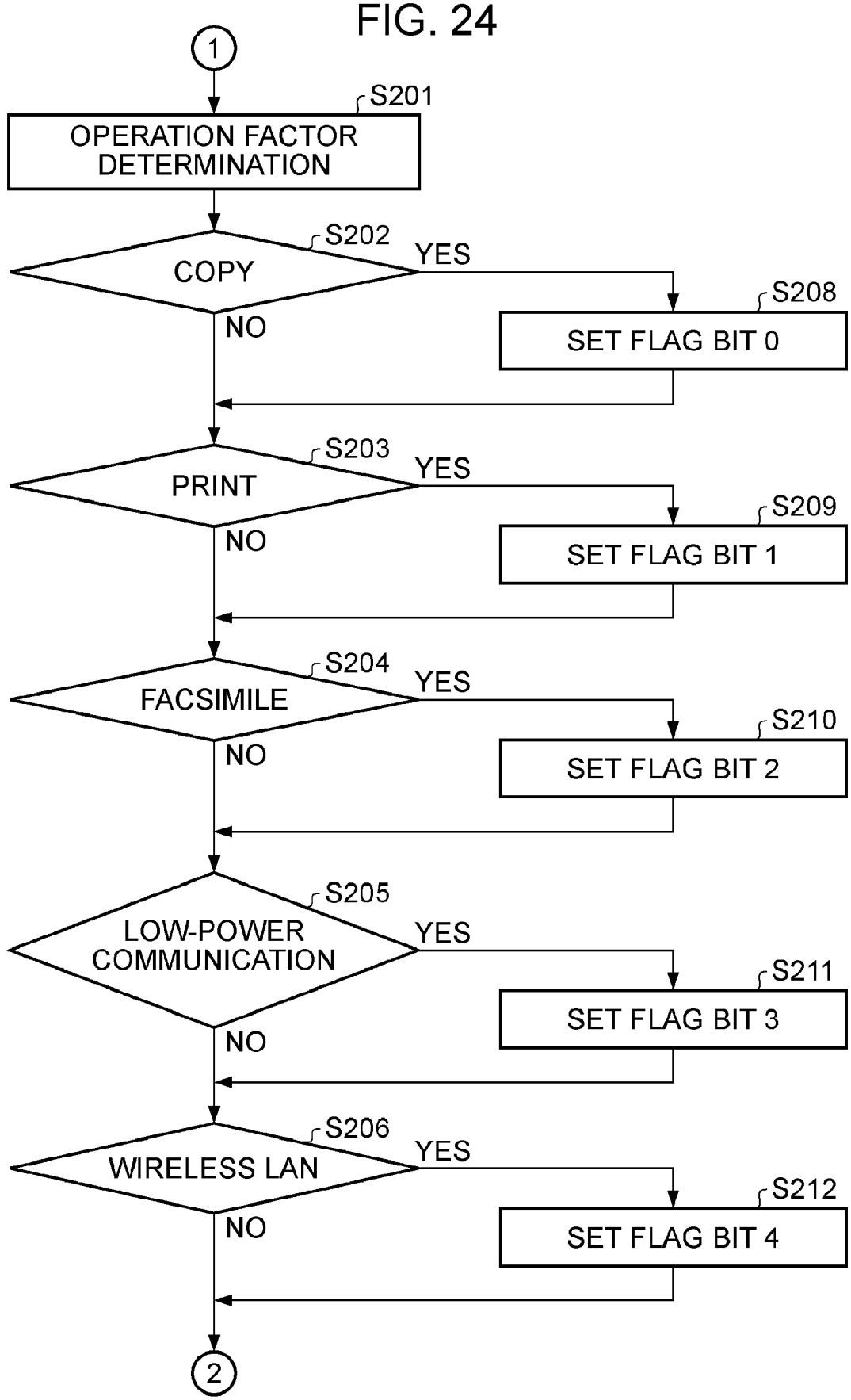
FIG. 24 is a flowchart of a control operation.

After the processing in step S110, the flow proceeds to step S201 of FIG. 24.

In addition to the foregoing description, when the activation factor relates to low-power communication or wireless LAN processing, the power saving mode is maintained. After the low-power communication or the wireless LAN processing is terminated, as shown in reference numeral 7 in FIG. 23, the flow is controlled to return to step S105.

FIG. 24 is a flowchart of a flag setting process in the case where there is an operation request (yes) in step S111 of FIG. 23. In a predetermined area (flag_area) of the RAM 203, a flag corresponding to an operation request (process request) is assigned to each bit. Bit 0 corresponds to a copy operation flag. Bit 1 corresponds to a recording operation flag. Bit 2 corresponds to a facsimile communication flag. Bit 3 corresponds to a low-power communication (wireless phone) flag. Bit 4 corresponds to a wireless LAN flag.

The CPU 306 determines the details of the operation request based on the presence of an interruption signal (S201). The interruption signal may be detected by polling the key input unit 215 or by periodically reading the hook detector 216. The interruption signal may be output from the communication processor 204, the low-power wireless unit 210, the wireless LAN communication processor 224, or the USB I/F 225.

When the CPU 306 polls the key input unit 215 and detects that a copy key 406 has been pressed (yes in step S202), the CPU 306 sets a flag indicating that a copy operation has started to bit 0 of the predetermined area (flag_area) (S208).

When the determination in step S202 is no, the CPU 306 checks for an interruption signal from the USB I/F 225 (S203). When there is an interruption signal from the USB I/F 225 (yes in S203), the CPU 306 sets a flag indicating that a print operation has started to bit 1 of flag_area (S209).

When the determination in step S203 is no, the CPU 306 performs polling to check for a signal indicating that the facsimile transmission (Tx) key 404 or the facsimile reception (Rx) key 405 has been pressed or a signal from the DSP 205. That is, the CPU 306 polls the presence of a calling (CNG) signal. If there is a CNG signal detected by polling (yes in S204), a flag indicating that a facsimile communication operation has started is set to bit 2 of flag_area (S210).

When the determination in step S204 is no, the CPU 306 performs polling to check for a signal indicating that the extension key 402 has been pressed or a signal from the low-power wireless unit 210. If a signal is detected (yes in S205), a flag indicating that a low-power wireless communication operation has started is set to bit 3 of flag_area (S211).

When the determination in step S205 is no, the CPU 306 performs polling to check for a signal from the wireless LAN communication processor 224. If a signal is detected (yes in S206), a flag indicating that a wireless LAN communication operation has started is set to bit 4 of flag_area (S212).

Figure 25:
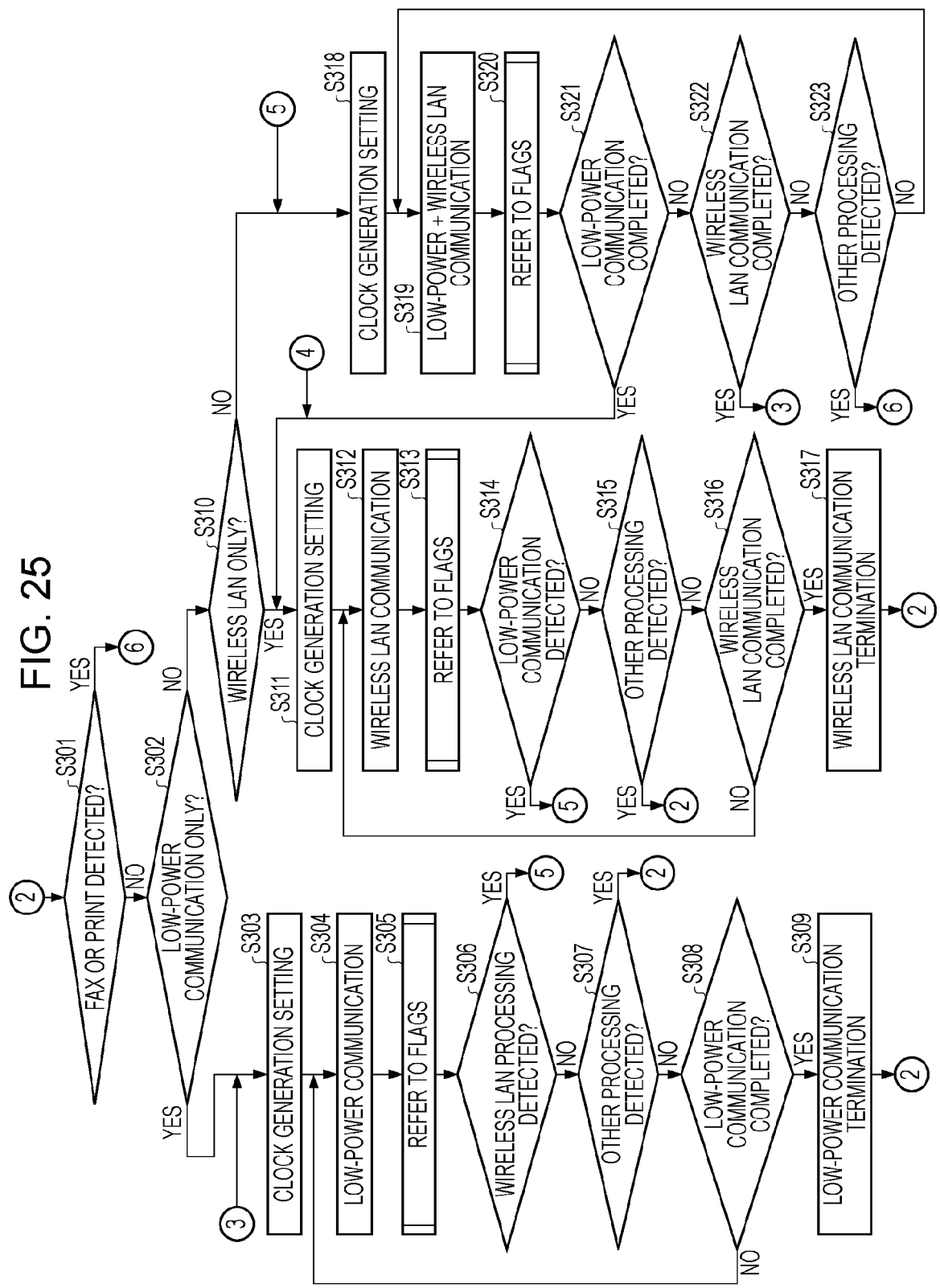
FIG. 25 is a flowchart of a control operation.

FIG. 25 is a flowchart of a communication process performed using a wireless communication unit.

When the flag setting processing is completed, the CPU 306 refers to the flags in flag_area and starts a process. When one of the flag bits 1 and 2 is set, the CPU 306 performs a facsimile communication operation or a recording operation (yes in S301).

In contrast, when the determination in step S301 is no, the flow proceeds to step S302. The CPU 306 determines whether only the low-power wireless communication flag has been set (S302). If the determination in step S302 is yes, the flow proceeds to step S303. In step S303, the CPU 306 performs clock generation setting processing. As defined in FIG. 13C, the spreading mode is set to the center spread mode, and the spreading rate is set to 0.5%.

Accordingly, the oscillation controller 302 outputs a clock signal. In step S304, the CPU 306 performs low-power communication processing.

When the CPU 306 starts low-power wireless communication, the CPU 306 refers to the flags (S305) to check for the presence of other operation requests. The CPU 306 determines whether the wireless LAN processing is detected (S306) and whether other processing is detected (S307). The CPU 306 further determines whether the low-power communication is completed (S308). If the low-power communication is still being performed (no in S308), the flow returns to step S304. When it is determined in step S308 that the low-power communication is completed (yes in S308), low-power communication termination processing is performed in step S309. Thereafter, the flow returns to step S302.

When the determination in step S302 is no, in step S310, it is determined whether only the wireless LAN flag has been set (S310).

When only the wireless LAN flag has been set (yes in S310), that is, when the CPU 306 determines that only the flag bit 4 of flag_area has been set (yes in S310), in step S311, the CPU 306 performs the clock generation setting processing. As defined in FIG. 13C, the spreading mode is set to the up spread mode, and the spreading rate is set to 3%. Accordingly, the oscillation controller 302 outputs a clock signal. In step S312, the CPU 306 performs the wireless LAN communication processing.

When the CPU 306 starts wireless LAN communication, the CPU 306 refers to the flags (S313) to check for the presence of other operation requests. The CPU 306 determines whether low-power communication is detected (S314) and whether other processing is detected (S315). The CPU 306 further determines whether the wireless LAN communication is completed (S316). If the wireless LAN communication is still being performed (no in S316), the flow returns to step S312. When it is determined in step S316 that the wireless LAN communication is completed, wireless LAN communication termination processing is performed in step S317. Thereafter, the flow returns to step S302.

When the determination in step S310 is no, in step S318, the CPU 306 performs the clock generation setting processing so that both low-power communication and wireless LAN communication can be performed. As defined in FIG. 13C, the spreading mode is set to the down spread mode, and the spreading rate is set to 0.5%. Accordingly, the oscillation controller 302 outputs a clock signal. In step S319, the CPU 306 performs the wireless LAN communication processing and the low-power communication processing.

Next, the CPU 306 refers to the flags (S320) to check for the presence of other operation requests.

In step S321, the CPU 306 determines whether the low-power communication is completed. When the determination in step S321 is yes, the flow proceeds to step S311. When the determination in step S321 is no, the flow proceeds to step S322. In step S322, the CPU 306 determines whether the wireless LAN processing is completed. When the determination in step S322 is yes, the flow proceeds to step S303. When the determination in step S322 is no, the flow proceeds to step S323.

In step S323, the CPU 306 checks for the presence of other operation requests. If there is such a request for another operation (yes in S323), the flow proceeds to step S401.

The control flow shown in FIG. 25 has been described above. In addition to the foregoing description, when the flow proceeds to step S301 in the power saving mode, a control flow in which the flow returns to step S105 of FIG. 23 after wireless communication is completed may be provided.

FIG. 26 is a flowchart of an operation in which facsimile transmission/reception or a recording operation is performed. The control flow shown in FIG. 26 is performed when the determination in step S301 of FIG. 25 is yes or when the determination in step S323 of FIG. 25 is yes.

The CPU 306 refers to the flag bit 1 or the flag bit 2 (S401). When the flag bit 2 has been set (facsimile communication), the flow proceeds to step S402. When the flag bit 1 has been set (recording operation), the flow proceeds to step S411. In step S402, the CPU 306 performs control so that CLK1 with a frequency of 96 MHz is output. Also in step S402, the CPU 306 sets the oscillation controller 302 to perform modulation in the down spread mode at a spreading rate of 3%.

The CPU 306 performs facsimile communication (S403), refers to the flags (S404), and determines whether the facsimile communication is completed (S405). When the facsimile communication is completed (yes in S405), the flow proceeds to step S406, and the CPU 306 resets the flag bit 2. In contrast, when the facsimile communication is not completed (no in S405), the flow returns to step S403.

In step S411, the CPU 306 performs control so that CLK1 with a frequency of 192 MHz is output. Also in step S411, the CPU 306 sets the oscillation controller 302 to perform modulation in the down spread mode at a spreading rate of 3%.

The CPU 306 performs a recording (print) operation (S412), refers to the flags (S413), and determines whether the recording (print) operation is completed (S414). When the operation is completed (yes in S414), the flow proceeds to step S415, and the CPU 306 resets the flag bit 1. In contrast, when the operation is not completed (no in S414), the flow returns to step S412. When a facsimile communication request is detected in step S416, the flow proceeds to step s402. In contrast, when no facsimile communication request is detected in step S416, the flow proceeds to step S407.

The CPU 306 checks the flag bit 3 and the flag bit 4 in flag_area to detect the presence of a wireless communication request. When both the flag bit 3 and the flag bit 4 in the RAM 203 have been set (yes in S407), the flow proceeds to step S318 of FIG. 25. In step S318, the CPU 306 performs control so that a clock signal modulated in the down spread mode at a spreading rate of 0.5% is output.

When the CPU 306 detects that only the flag bit 4 in flag_area has been set (yes in S408), it is determined that there is a request for wireless LAN communication, and the flow proceeds to step S311 of FIG. 25. In step S311, the CPU 306 performs control so that a clock signal modulated in the up spread mode at a spreading rate of 3% is output.

In contrast, when the CPU 306 detects that only the flag bit 3 in flag_area has been set (yes in S409), the flow proceeds to step S303 of FIG. 25. In step S303, the CPU 306 performs control so that a clock signal modulated in the center spread mode at a spreading rate of 0.5% is output.

Alternatively, when the CPU 306 determines that the flag bit 3 and the flag bit 4 in flag_area have not been set (no in S409), the CPU 306 performs control so that CLK1 has a frequency of 48 MHz.

Other Embodiments

In the foregoing embodiments, the frequency spreading mode and the frequency spreading rate are changed according to the frequency bands used in wireless communication.

Another embodiment is described below. For example, a method of changing the frequency of a carrier to a low frequency band (275.162 MHz to 276.262 MHz) and then performing demodulation is available as a reception method for wireless phones.

When there is a frequency band used in the internal processing, the reception processing is affected, and the reception sensitivity and sound quality are degraded. In order to overcome this problem, the spreading mode and the spreading rate may be changed taking into consideration the frequencies used in the internal processing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-120905 filed May 1, 2007, which is hereby incorporated by reference herein in its entirety.

What is claimed is:

1. An electronic apparatus comprising:
a generating unit configured to generate a clock signal, used for controlling the electronic apparatus, of a frequency, and to modulate the clock signal according to a modulation method;
a wireless communication unit configured to execute a wireless communication with a wireless device using a predetermined frequency range, according to a control using the clock signal generated and modulated by the generating unit;
a recording unit configured to execute a recording operation to record an image on a recording sheet according to a control using the clock signal generated and modulated by the generating unit;
a determining unit configured to determine whether each of the wireless communication by the wireless communication unit and the recording operation by the recording unit is executed; and
a deciding unit configured to, in a case where the determining unit determines at least one process of the wireless communication by the wireless communication unit and the recording operation by the recording unit is executed, decide a combination of a frequency of the clock signal generated by the generating unit and the modulation method of the modulation by the generating unit used for the at least one executed process, the deciding unit being capable of deciding a plurality of combinations which are different depending on whether both of the wireless communication by the wireless communication unit and the recording operation by the recording unit are executed, or either of the wireless communication or the recording operation is executed.

2. The electronic apparatus according to claim 1, wherein the modulation method is at least one of a modulation ratio of the modulation and a modulation mode of the modulation.

3. The electronic apparatus according to claim 2, wherein the modulation mode at least includes a mode for spreading the frequency of the clock signal among a spectrum of frequencies above a reference frequency and a mode for spreading the frequency of the clock signal among a spectrum of frequencies below the reference frequency.

4. The electronic apparatus according to claim 1, wherein the wireless communication unit comprises a wireless local area network (LAN) communication unit configured to execute a wireless LAN communication, and wherein the deciding unit decides the combination of the frequency of the clock signal and the modulation method of the modulation, based on whether the wireless LAN communication is executed.

5. The electronic apparatus according to claim 1, wherein the wireless communication unit comprises a wireless phone communication unit configured to execute a wireless phone communication, and wherein the deciding unit decides the combination of the frequency of the clock signal and the modulation method of the modulation, based on whether the wireless phone communication is executed.

6. The electronic apparatus according to claim 1, wherein the deciding unit decides both the combination of the frequency of the clock signal and the modulation method of the modulation, further based on whether a facsimile communication operation to transmit an image via a public network is executed.

7. The electronic apparatus according to claim 1, wherein, when the wireless communication is executed, the deciding unit decides the combination different from the combination used when the wireless communication is not executed based on the predetermined frequency range used in the wireless communication.

8. The electronic apparatus according to claim 1, wherein, when both of the recording operation and the wireless communication are executed, the deciding unit decides the combination different the combination used when the recording operation is not executed and the wireless communication is executed.

9. The electronic apparatus according to claim 1, wherein when the wireless communication is executed, the deciding unit decides the combination used for the control of the wireless communication based on the predetermined frequency range, so as to decrease an interference with the wireless communication using the predetermined frequency by the clock signal.

10. A method for controlling an electronic apparatus comprising a wireless communication unit configured to execute a wireless communication with a wireless device using a predetermined frequency range according to a control using a clock signal and a recording unit configured to execute a recording operation to record an image on a recording sheet according to a control using a clock signal, comprising:
   generating a clock signal, used for controlling the electronic apparatus, of a frequency;
   modulating the generated clock signal according to a modulation method;
   determining whether each of the wireless communication by the wireless communication unit and the recording operation by the recording unit is executed; and
   deciding, in a case where the determining unit determines at least one process of the wireless communication by the wireless communication unit and the recording operation by the recording unit is executed, a combination of the frequency of the clock signal and the modulation method of the modulation, capable of deciding a plurality of combinations which are different depending on whether both of the wireless communication by the wireless communication unit and the recording operation by the recording unit are executed, or either of the wireless communication or the recording operation is executed.

11. The method according to claim 10, wherein the modulation method is at least one of a modulation ratio of the modulation and a modulation mode of the modulation.

12. The method according to claim 10, wherein the wireless communication unit comprises a wireless local area network (LAN) communication unit configured to execute a wireless LAN communication, and wherein the combination of the frequency of the clock signal and the modulation method of the modulation is decided, based on whether the wireless LAN communication is executed.

13. The method according to claim 10, wherein the wireless communication unit comprises a wireless phone communication unit configured to execute a wireless phone communication, and wherein the combination of the frequency of the clock signal and the modulation method of the modulation is decided, based on whether the wireless phone communication is executed.

14. The method according to claim 10, wherein the combination of the frequency of the clock signal and the modulation method of the modulation is decided, based on whether a facsimile communication operation to transmit an image via a public network is executed.

15. A non-transitory computer-readable storage medium which stores a program for causing a computer to execute the method according to claim 10.

* * * * *